(12) United States Patent  (10) Patent No.: US 7,899,803 B2
Cotter et al.  (45) Date of Patent: Mar. 1, 2011

(54) MULTI-VIEW INTERNET SEARCH MASHUP

(75) Inventors: Brandon Cotter, Dallas, TX (US); Christopher J. Mancini, Lucas, TX (US)

(73) Assignee: Viewzi, Inc., Dallas, TX (US)

( * ) Notice: Subject to any disclaimer, the term of this patent is extended or adjusted under 35 U.S.C. 154(b) by 307 days.

(21) Appl. No.: 12/033,823

(22) Filed: Feb. 19, 2008

(65) Prior Publication Data

US 2008/0201326 A1  Aug. 21, 2008

Related U.S. Application Data

(60) Provisional application No. 60/902,299, filed on Feb. 19, 2007.

(51) Int. Cl.
*G06F 17/30* (2006.01)

(52) U.S. Cl. ........................ 707/706; 707/717

(58) Field of Classification Search ................ 707/706, 707/717

See application file for complete search history.

(56) References Cited

U.S. PATENT DOCUMENTS

| | | | |
|---|---|---|---|
| 6,271,840 B1 | 8/2001 | Finseth et al. | |
| 6,493,702 B1 * | 12/2002 | Adar et al. | 707/706 |
| 6,829,599 B2 | 12/2004 | Chidlovskii | |
| 6,944,612 B2 * | 9/2005 | Roustant et al. | 707/706 |
| 7,031,968 B2 * | 4/2006 | Kremer et al. | 707/706 |
| 7,035,844 B2 * | 4/2006 | Andreev et al. | 707/706 |
| 7,039,625 B2 * | 5/2006 | Kim et al. | 707/706 |
| 7,039,630 B2 * | 5/2006 | Shimazu | 707/706 |
| 7,103,589 B1 * | 9/2006 | Kepler et al. | 707/706 |
| 7,103,594 B1 * | 9/2006 | Wolfe | 707/706 |
| 7,133,867 B2 * | 11/2006 | Irle et al. | 707/706 |
| 7,139,778 B2 * | 11/2006 | Chaudhuri et al. | 707/717 |

(Continued)

FOREIGN PATENT DOCUMENTS

EP  0694857 A1  1/1996

OTHER PUBLICATIONS

Lawrence, et al.; "Context and Page Analysis for Improved Web Search"; IEEE internet Computing; Jul.-Aug. 1998; pp. 38-46.

*Primary Examiner* — Don Wong
*Assistant Examiner* — Kim T Nguyen
(74) *Attorney, Agent, or Firm* — David W. Carstens; Steven H. Washam; Carstens & Cahoon, LLP

(57) ABSTRACT

An internet search utility that combines and presents search results from disparate data sources to the user in a multi-view format. The search terms are disambiguated and a series of prioritized Views is displayed to the user in a View Mix interface. Each View includes a unique interface, processing widgets, and a unique combination of data sources. A View Picker determines, based on specific criteria, which Views are relevant and prioritizes the Views for the View Mix. As the user considers which View to select, the Pre-Caching Module conducts a background search, and preloads snapshots of top URLs for display. Selecting a particular View initiates a search per the instructions of that view. The resulting data is displayed in the View format. Views may be created by third parties or end users to reflect any particular preference thus yielding a multitude of unique views from which to consume search results.

22 Claims, 16 Drawing Sheets

U.S. PATENT DOCUMENTS

| | | |
|---|---|---|
| 7,146,356 B2 * | 12/2006 | Choi et al. .................. 707/706 |
| 7,165,080 B2 * | 1/2007 | Kotcheff et al. ............. 707/706 |
| 2004/0049541 A1 | 3/2004 | Swahn |
| 2005/0267872 A1 | 12/2005 | Galai et al. |
| 2005/0283468 A1 | 12/2005 | Kamvar et al. |
| 2006/0026013 A1 | 2/2006 | Kraft |
| 2006/0129907 A1 | 6/2006 | Volk et al. |
| 2006/0224582 A1 | 10/2006 | Hogue |
| 2006/0265417 A1 * | 11/2006 | Amato et al. ............... 707/102 |
| 2007/0244866 A1 | 10/2007 | Mishkanian et al. |
| 2007/0255755 A1 | 11/2007 | Zhang et al. |
| 2008/0109401 A1 * | 5/2008 | Sareen et al. .................. 707/3 |
| 2008/0133482 A1 | 6/2008 | Anick et al. |
| 2008/0140712 A1 | 6/2008 | Weber et al. |
| 2008/0140806 A1 | 6/2008 | Kumar |

* cited by examiner

Step 1

Step 2

Step 3

MULTI-VIEW INTERNET SEARCH MASHUP

CROSS-REFERENCE TO RELATED APPLICATIONS

This application claims the benefit of provisional Application No. 60/902,299, filed Feb. 19, 2007.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to internet search utilities and, more specifically, to an internet application that combines disparate data sources to obtain focused search results for presentation in a customizable, targeted, user-friendly format.

2. Description of Related Art Including Information Disclosed Under 37 CFR 1.97 and 1.98

Recently, popular news, social networking and blogging web sites such as MySpace (myspace.com), YouTube (youtube.com), Flickr (flickr.com), Facebook (facebook.com), Blogger (blogger.com), and the like have facilitated a flood of information on the Internet. However, the ways in which this information is searched and retrieved has remained essentially unchanged.

Traditional search engines index this information using automated programs or scripts known as web crawlers. These automated crawlers visit URLs and create indexes to content that they encounter and/or download actual copies of the content to localized servers. A user performing a search for content using these search engines then inputs a text string as a search query. Backend algorithms parse the search query terms and generate results based on the stored indexes. Finally, the results are categorized or ranked for presentation to the user.

FIG. 1 depicts a prior art search process using the Google search engine. For example, a search for "Crash" (102) utilizing the Google search engine (104) yields approximately 172 million results (106). Naturally, such a large number of results must be split among multiple display pages. The first page typically displays 10 results as linear textual information interspersed with various hyperlinks to the original or related content (106). If the first 10 displayed results do not satisfy a user, the user is forced to select page after page to display the remaining results in increments of 10, or submit a modified search in an effort to get the Google search algorithm to narrow the overall count.

A search for "Crash" utilizing the Yahoo search engine yields a staggering 426 million results. This search engine also returns results in the same linear textual format with various hyperlinks to the original or related content. Again, such an unmanageably large number of results must be split among an even greater number of pages, forcing the requester to navigate page after page of text until the relevant information is located.

The above is an example of a "one search request in—one search result out" methodology as is commonly used. This methodology forces the user to modify and refine search requests if the results provided by the initial search request do not yield acceptable results. For the advanced searcher, additional clarity or narrowing of the search results can only be achieved with painstakingly created Boolean constructs.

Moreover, the textual format in which the results are returned (106) is at best cumbersome for a user to evaluate. Users must read through the text results to determine whether a particular result is referring to a text, video, or some other type of document. While informative, the use of text to describe results does not convey information as efficiently as other, more visual forms.

Other attempts have been made to improve on this search methodology. For example, Rollyo (rollyo.com) and Dogpile (dogpile.com) each offer a service that allows a user to combine search utilities. This allows a user to conduct a search on multiple search engines from one interface (also known as a "meta" search). However, the results returned by this utility are the same voluminous pages of linear textual information and hyperlinks as mentioned previously in a typical Google search result. Although Google is a "primary indexer" of websites and Rollyo and Dogpile are not, to the end user the differences in the returned result are slim. Again, the user must view page after page of textual results to locate information relevant to his or her search request.

Accordingly, a need exists for a search utility that can retrieve, package and present search results in an efficient and user-friendly fashion. The presentation of the results should be tailored to the particular search, and should provide the user with combinations of views or perspectives with which to access the information in a more useful and intuitive fashion. For example, medical search results are more linear and the returned results should be more utilitarian in nature and include important information such as source and date. In contrast, a celebrity search result should include photos, videos, blog posts, etc. and the presentation or user interface should be more fun and whimsical. The present invention addresses these needs and others as presented by the following discussion in light of the accompanying drawings.

BRIEF SUMMARY OF THE INVENTION

The present invention overcomes many of the disadvantages of the prior art by providing an Internet search utility that accepts a user's search request and returns highly relevant results to the user, with the results presented in multiple "Views." FIG. 2 depicts the steps. From the user interface, the user inputs a search term (STEP 1) and is presented with a number of Views. A "term" can be one or more words, numbers or symbols or other distinguishable signals. The user selects a particular View (STEP 2) and receives the results packaged in a unique, user-friendly format specific to the View (STEP 3). More specifically, the invention accepts a user's search request; disambiguates the request string; presents multiple views to the user based on relevance to the search terms; obtains search results from a plurality of data sources; and presents to the user highly focused and relevant search results in a customizable multimedia format.

A "View," as defined by the invention, is a unique combination of user interface; processing widgets; and data sources that, together, present a set of search results to the user. A widget is a small application or software component that performs some action on the displayed data (e.g., "de-duplicate"). Instead of merely returning a list of text results to the user in response to a search request, the user is displayed multiple relevant views (called the "View Mix") based on specific criteria. Views are customizable in that developers can build Views to feature specific content and to access any number of data sources. Also, to support system development and operational costs, it is also possible to provide ad space for third-party advertisements on a View. Thus, each View features it own unique attributes.

Each View must provide search results in some distinct fashion to the end-user. While most Views will "mashup" multiple data sources, this is not mandatory for every View. For example, some Views may provide a new and creative presentation of search against a single data source like Amazon, Flickr, eBay, or other Web site. In this case, the View is providing a perspective of the search function than differs from the one offered by the host site (Amazon, for example).

A "View Picker" component determines which View is appropriate and relevant for a given search request. In making this decision, the View Picker considers criteria such as the search term, user preferences, and usage history for the particular user. Other criteria may include metrics related to advertisements as well as additional monies paid by a corporate View sponsor to increase the priority of its View. The View Picker is designed to provide the best Views; appropriate View diversity; and appropriate View quantity. Once the Views are designated and prioritized, they are displayed in the "View Mix" interface to the user.

A "Pre-Cache Module" receives a search request in parallel to the View Picker. It then makes an external query of one or more popular data sources and screenshots the resulting URLs so that both the search result data and the screenshot will be ready in advance of the user selecting a View. This Pre-Cache Module is designed to improve system performance by estimating what data sources and screenshots may be requested by the user's subsequent selection of a View and then taking some preemptive action to help pre-cache some of this data.

A "button" utility in another embodiment is present on the user's browser toolbar. As the user visits a page with information about which the user would like to learn more, the button can be "pressed." This causes the system to parse and analyze the user's displayed webpage to automatically extract the information relevant to the user's interests. The present embodiment will parse some or all of the information contained on a given webpage, including, for example, the computer code, meta tags, uniform resource locator (URL), RSS information, and text displayed to the user. This information is then analyzed to determine what information on the webpage is most relevant to the interests of the user. A search is then conducted based on this information.

These and other improvements will become apparent when the following detailed disclosure is read in light of the supplied drawings. This summary is not intended to limit the scope of the invention to any particular described embodiment or feature. It is merely intended to briefly explain some of the key features in order to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein:

FIG. 12 is a representation of the "Book View," and is an example of one embodiment of a specialized View;

FIG. 13 is a representation of the "Gadget View," and is an example of one embodiment of a specialized View;

FIG. 14 is a representation of the "News View," and is an example of one embodiment of a specialized View;

Figure 1:
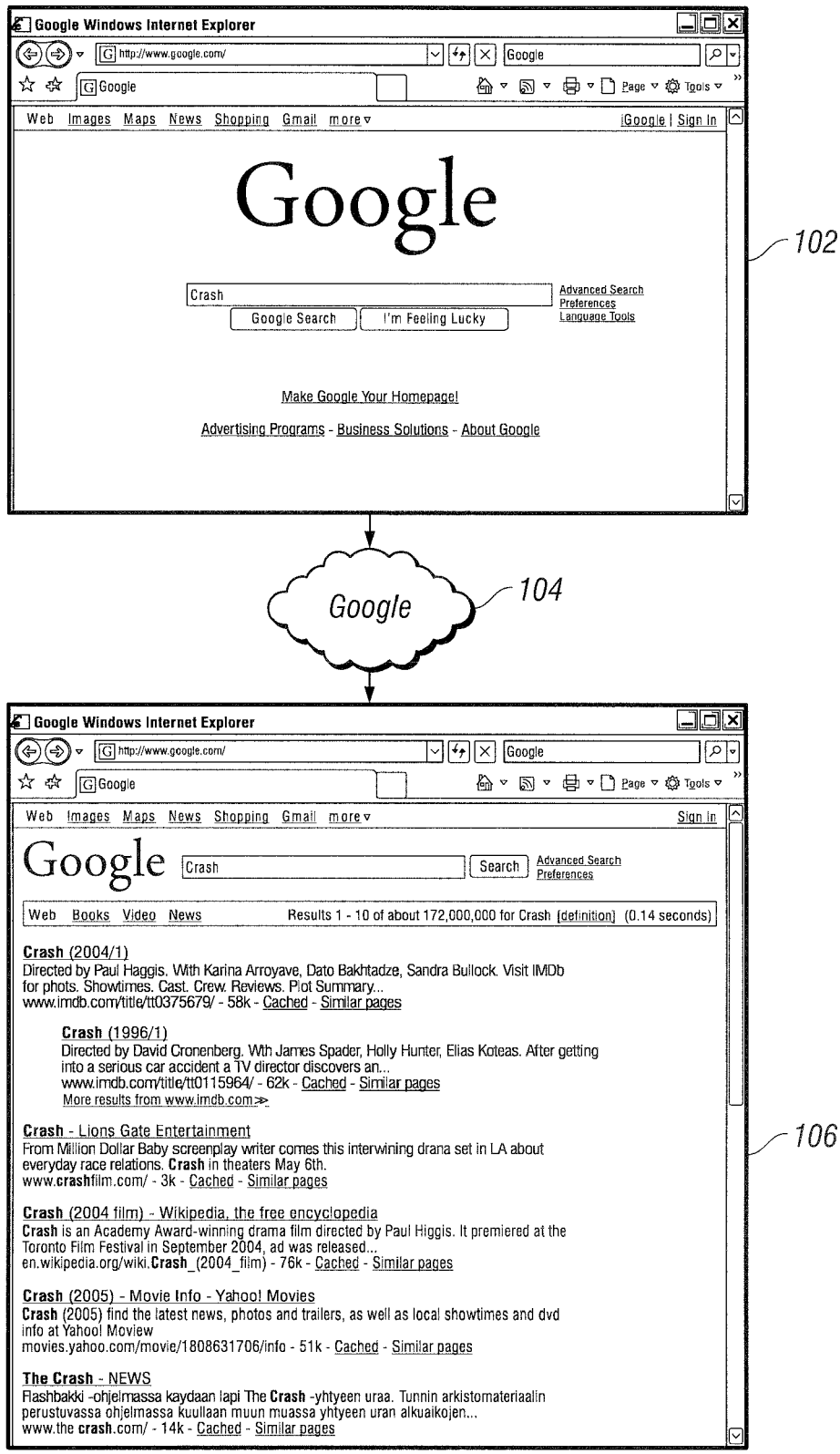
FIG. 1 is a flow diagram depicting a search using the prior art search engine Google.
Figure 2:
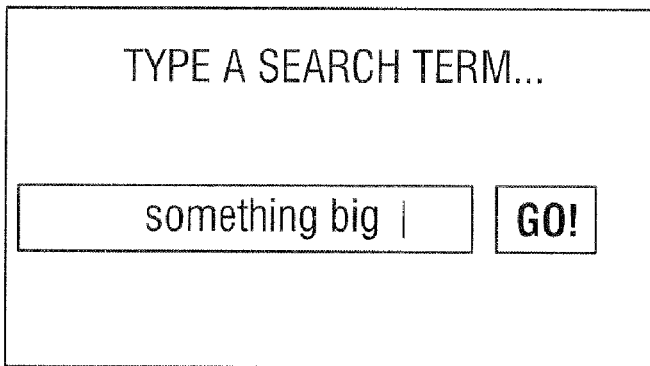
FIG. 2 depicts the basic steps of a search from the user's viewpoint using the present invention.
Figure 2:
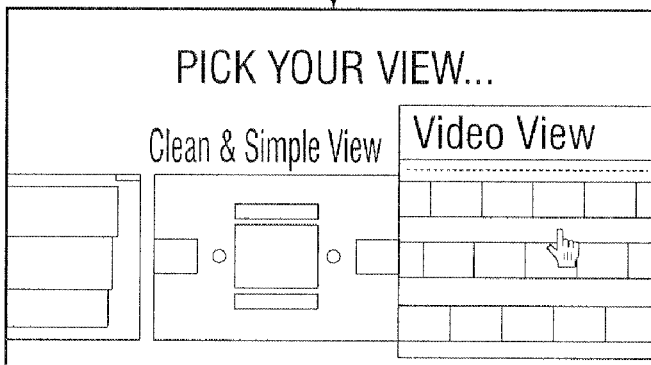
Figure 2:
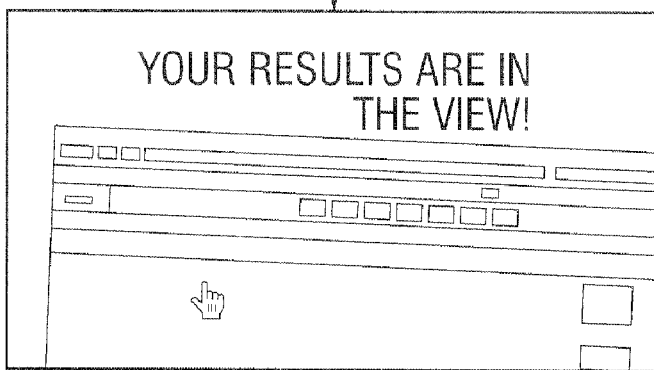

The above figures are provided for the purpose of illustration and description only, and are not intended to define the limits of the disclosed invention. Use of the same reference number in multiple figures is intended to designate the same or similar parts. Furthermore, when the terms "top;" "bottom;" "first;" "second;" "upper;" "lower;" "height;" "width;" "length;" "end;" "side;" "horizontal;" "vertical;" and similar terms are used herein, if at all, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood. (58,266).

DETAILED DESCRIPTION OF THE INVENTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Overall System Flow Diagram

Figure 3:
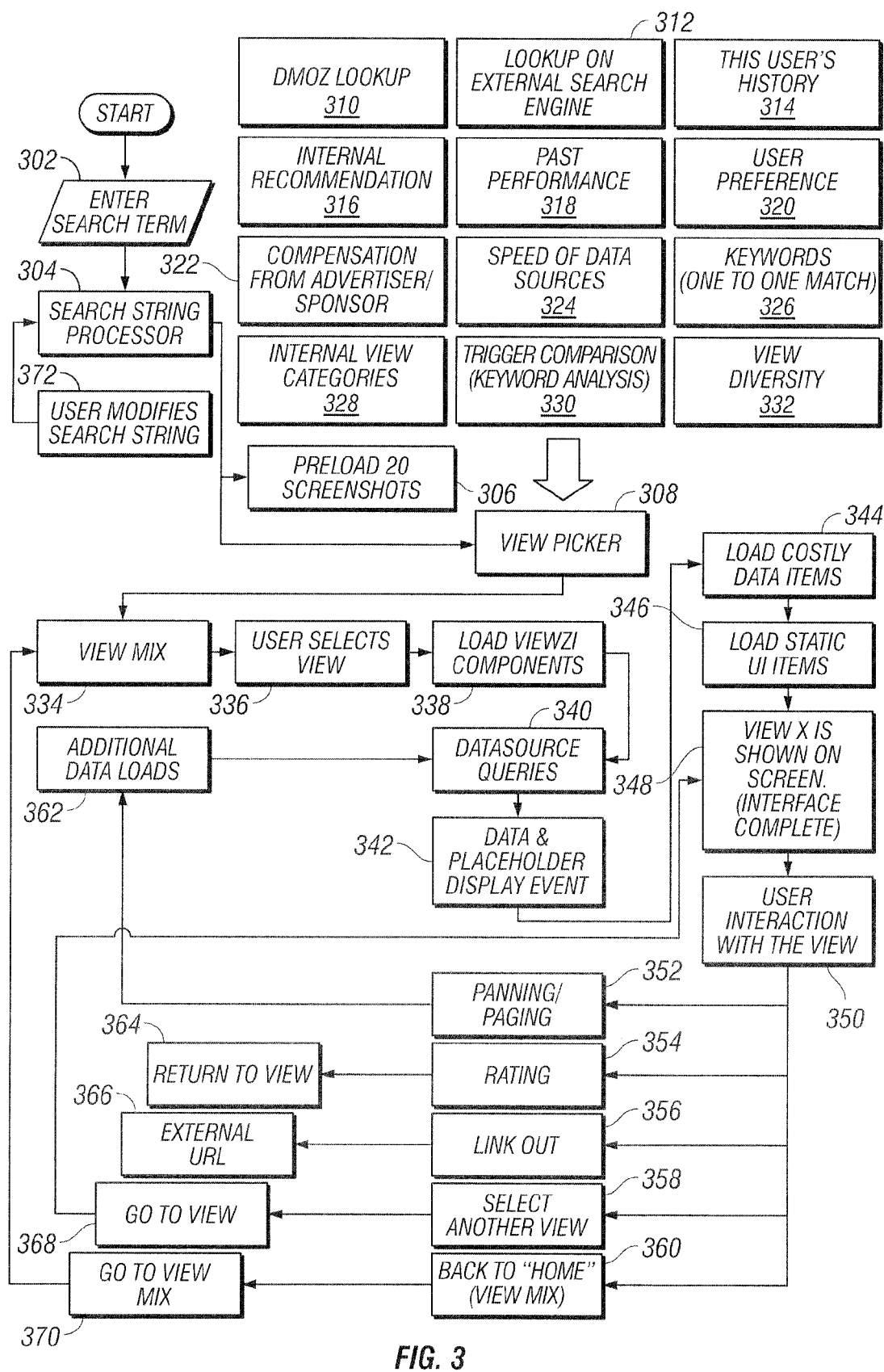
FIG. 3 is a flow diagram representing the overall processing steps taken in a first embodiment of the present invention.
Figure 5:
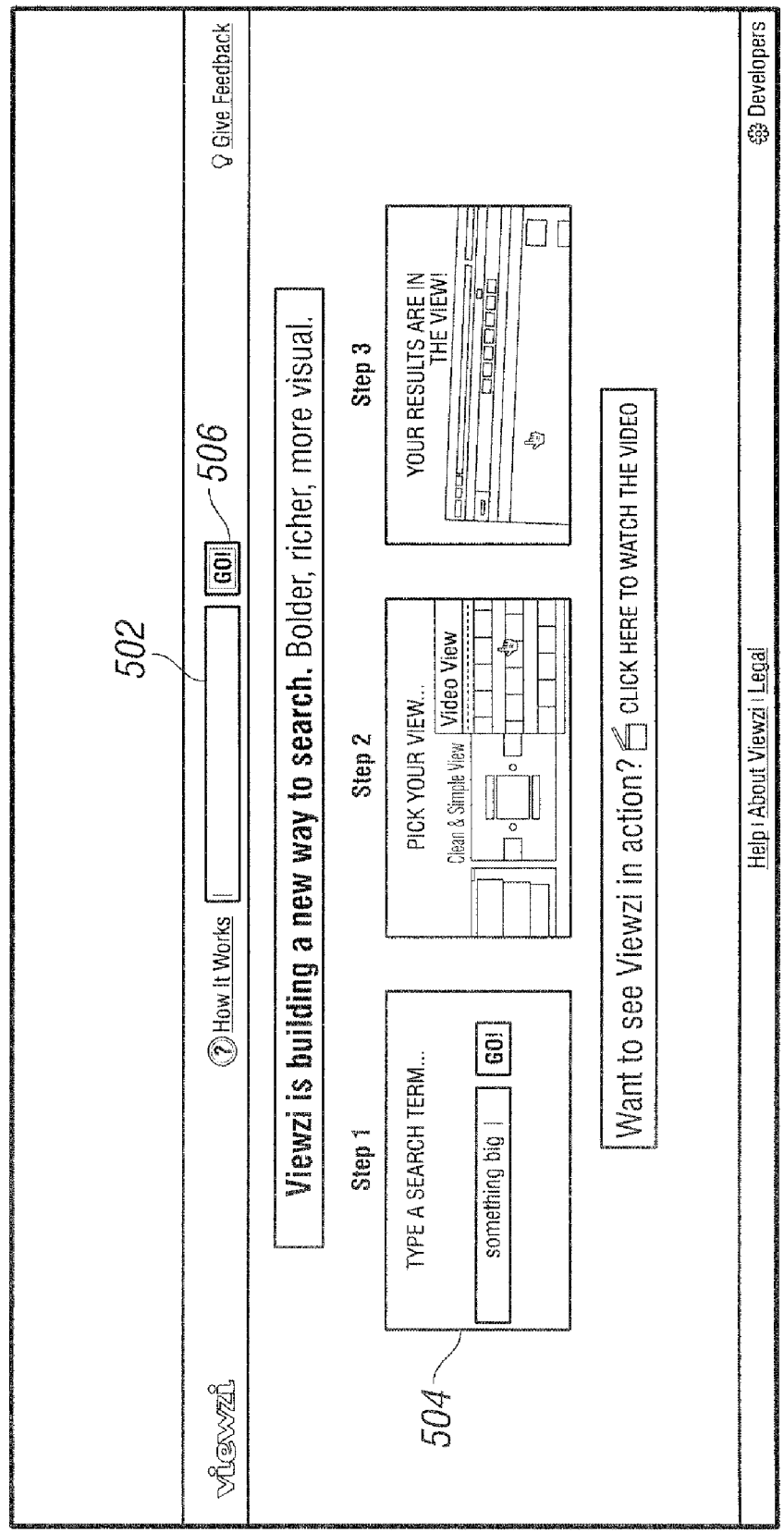
FIG. 5 is representation of the main user interface in an embodiment of the present invention as used for inputting an initial search request.

FIG. 3 depicts a flow diagram of the overall processing steps taken by the present invention. The user first enters a search term (302). This term is passed to the search string processor (304) where it is checked for spelling and scrubbed for foreign or unrecognized characters. The processor (304) then formats the string for further processing by the subsequent modules. FIG. 5 depicts an embodiment of the initial user interface (500) as used to initiate a search. The user enters his or her search term in the text box (502).

The formatted search string is passed to the pre-caching module (the "preloader") (306). The preloader is designed to remove any potential latency in obtaining search result Web page screenshots. It does this by performing a pre-search of the search string on one or more of the top data sources and preloading the Web pages associated with the top twenty search results returned. The top few data sources are used because there is a high likelihood that at least one of the returned Views will utilize them as well.

Once the Web pages are preloaded, a screenshot of each is taken and stored in a directory on the server. In one embodiment, the system creates a headless instance of a browser to load each link. This headless browser instance allows the Web page to be loaded in system memory without rendering the image on a display. In another embodiment, an actual browser instance is utilized and is capable of display on a user's computer display.

Upon request for a web screenshot, a Queue Manager hands off the URL requested to a screenshotter instance. The screenshotter utilizes an embedded HTML rendering engine to retrieve the remote web page and render it to memory. The system waits until the rendering engine enters a "load complete" stage and then takes a screenshot by capturing a file image of the memory map of the rendered web page. Because various elements of a given Web page take a non-deterministic amount of time to load (such as advertisements or videos), the system waits for a predetermined period of seconds and takes a second screenshot. To guarantee that all elements of the web page have had a chance to load and be displayed, one or more subsequent screenshots can be taken after the rendering engine has completed its load stage, depending on the composition and elements included in the remote page. Second and later screenshots replace earlier screenshots so that the most recent is the one served upon request. The resulting screenshot is stored in a dedicated "objectstore" (a file storage area) in multiple resolutions, along with a time stamp so that subsequent requests for that remote URL can draw from this cache without having to retrieve the remote page, should the cached image be determined to be "fresh" enough (based on system parameters).

The system maximizes efficiency of Views that include screenshots by use of the Pre-Cache Module and a Predictive Screenshotter Module. The Pre-Cache Module discussed earlier which uses system idle time between the time when the user hits "go" and subsequently selecting a view. This Pre-Cache Module, operates slightly in advance of the View selection—and only works in response to a search query to obtain screenshots of resulting URLs. The Predictive Screenshotter Module operates independently of the user's search and can operate at any time. This allows the Predictive Screenshotter Module to utilize any idle processing time experienced by the system (such as during off-peak hours of use) to obtain screenshots of URLs. The URLs chosen by this module may include those popular URLs that are frequently returned as results across various search instances. Each of these modules allows the system to reduce or even eliminate the perceived latency encountered when selecting a view containing screenshots. The system of the present embodiment may pull the screenshot from system cache, memory, from a system database, offsite storage facility, or other network attached storage.

The present embodiment allows multiple simultaneous users. As such, multiple simultaneous search requests may be made at any given instant. To limit the loading of the hardware caused by the multiple preloader search requests, each requested preload of a pre-search results link is assigned a processing priority. High priority links are processed before those with relatively lower priorities. Also, because this preloading process is occurring in parallel with the primary search function of the embodiment, a user may select a particular View before the preload is completed. If this occurs, the priority of the respective results links may be adjusted.

For example, in the present embodiment the two top data sources at a particular time may be Google and Yahoo. The preloader performs a search on both data sources and considers the top twenty search results from each. If the selected View just happens to use one or more of these same data sources, it will be performing another search request in combination with the earlier preload request. The View selection search request will receive a higher priority than the preload request and, consequently, the search links will be loaded and screenshots taken of the resulting Web pages before the preload request completes. The preload request will then be ignored when it begins processing if the link screenshots already exist on the drive. In another embodiment, the preloader looks to the data sources of the first one or two Views and obtains the top search results in advance. Pre-caching the views may make more sense in this instance if it can be readily ascertained that the Views are highly relevant and the probability is sufficient that the user will select one of the first two Views. One skilled in the art will appreciate that the data sources chosen by the preloader may be determined by the system at runtime and may include any available data source.

The View Picker (308) receives the search string in parallel with the preloader (306) and performs the bulk of the processing for selecting Views to display. The View Picker considers various relevancy criteria in its selection process. For example, the search string is first disambiguated using one of a number of tools including DMOZ.org (310), internal data such as encyclopedias and dictionaries, and external search and keyword matching from external search engines (e.g., Yahoo, Google, etc.). The DMOZ project is an Open Directory Project (ODP) that helps to categorize a particular search term. The resulting disambiguation data (received from one or more of the above) is used by the View Picker to make View display decisions.

The resulting data from each will be used to determine what are likely to be the top categories for the user's search request. In turn, this data along with other relevancy criterion referenced below, is used to select and order views in the most optimal way for each user search request.

Figure 6:
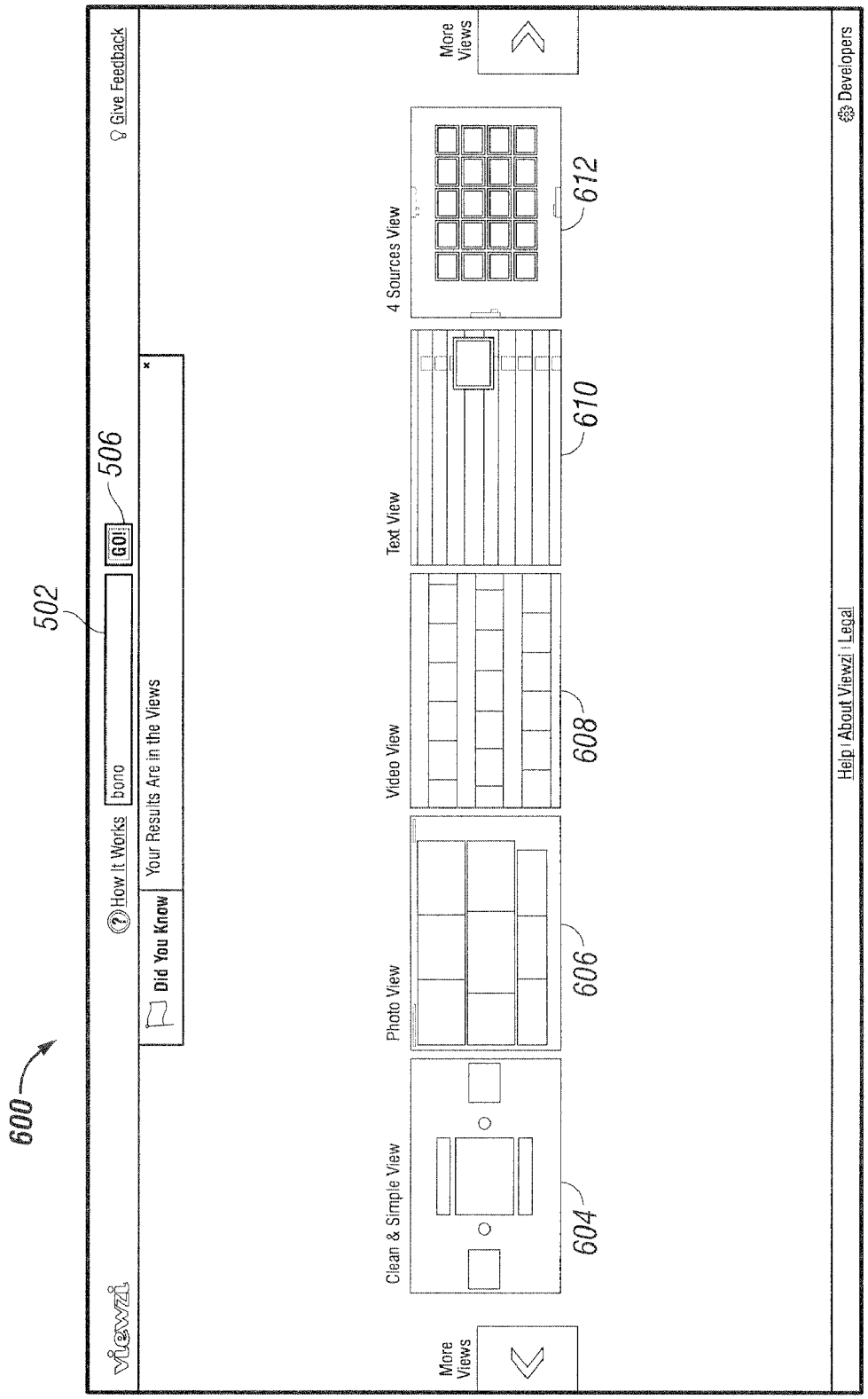
FIG. 6 is a representation of the View Mix user interface in an embodiment of the present invention as it presents Views associated with a search request.

Another example of relevancy criterion is keyword match (326). When creating a View, the creator specifies a set of keywords that help define the View and help better connect the View with the kinds of searches that the View is applicable for. The View Picker uses these keywords and attempts to match them (326) when selecting Views to display for a given search request. This is essentially a one-to-one match of keywords associated with a particular View to words found in the search term. FIG. 6 depicts an embodiment of the View Mix (600) as experienced by a user.

Another example of relevancy criterion is past performance (318). In selecting Views, the View Picker also considers past performance (318). The performance criteria considered involves measuring and then analyzing data collected about the View. This may include things like number of times the View was selected, time spent on the View (measured in seconds), % of View exits compared with overall visits (i.e., 500 visits to the View, and 100 exits from this View would be a 5:1 view/exit ratio, which is better than a View that has only 10 exits with the same number of visits).

Another example of relevancy criterion is internal recommendations (316). In selecting Views, the View Picker also considers internal recommendations (316). For example, the system may have pre-established criteria that it considers to force a given View to increase its relevancy. This criterion includes, but is not limited to, View "newness" (increasing the ranking of a View because it is new), View testing, company partnership or other business relationship.

Another example of relevancy criterion is external search engine semantic analysis (312). In this instance, the View Picker would request results from an external search engine (312), then apply some semantic analysis against these results and attempt to gain some knowledge about the results that would provide the View Picker to better select appropriate views.

Another example of relevancy criterion is trigger comparisons (330). In selecting Views, the View Picker also considers trigger comparisons (330). This involves a comparison of the keywords of the search term with keywords of Views. If the keywords have something in common, the particular View may be relevant and should be placed in the mix. This is similar to the previous keyword analysis (326). However, in this instance the keywords do not match—they are merely related.

Another example of relevancy criterion is View diversity (332). In selecting Views, the View Picker also considers View diversity (332). For example, a DMOZ lookup on a particular search term may return a number of hits in one specific category. To prevent a number of Views that are all similar (i.e., all 'medical' Views or all 'celebrity' Views), the system makes a judgment call to raise the relevance of other Views to ensure that the mix of Views provided is more diverse.

Another example of relevancy criterion is user preference (320). In selecting Views, the View Picker also considers user preferences (320). In one embodiment, the user is allowed to register with the system. Once registered, and when logged-in, the user may, when on a View, provide feedback for that View by voting. The View Picker then uses that data to increase the relevance of Views that a user has voted on positively.

Another example of relevancy criterion is user's search history (314). In selecting Views, the View Picker also considers the user's search history (314). In one embodiment, the system tracks the user's activities. If history shows that the user frequently searches for things in a particular domain or subject, then Views that match that subject may receive a higher relevance and may appear to the user more frequently. For example, a user who has frequently searched for food and wine related items may be shown more Views related to those subjects.

Another example of relevancy criterion is speed of data sources (324). In selecting Views, the View Picker also considers the speed of various data sources (324). The speed of data sources impacts user experience. A View may be relatively nice looking, but may feature slow data sources that adversely impact its performance. Consequently, the system monitors for poor performing data sources and will select similar Views with higher performing data sources.

Another example of relevancy criterion is compensation from an advertiser or sponsor (322). In selecting Views, the View Picker also considers compensation paid by advertisers or View sponsors (322). Views may feature advertisements someplace in the View adjacent to search results. In some cases, the entire View may be considered an advertisement, or a "Sponsored View". A sponsored view is one in which an advertiser or sponsor is paying for the entire view to increase the View's ranking. The system balances this compensation paid with other criteria to ensure that a totally irrelevant View is not shown merely because its advertiser or sponsor paid to have it shown. This is done to prevent or minimize negative user experience with the system.

Another example of relevancy criterion is internal View categories (328). In selecting Views, the View Picker also considers internal View categories (328). As Views are created, they may be assigned to particular categories. Once the search term has been disambiguated, the relevant categories may be determined and Views associated with those categories may enjoy a higher measure of relevance.

All of the inputs to the View Picker, including those listed here and others as may be implemented over time, are multiplied by a weighting factor that allows the View Picker to better reflect the importance of each criterion. Moreover, a given embodiment may include all, a subset, or a superset of the previously described inputs.

Figure 4:
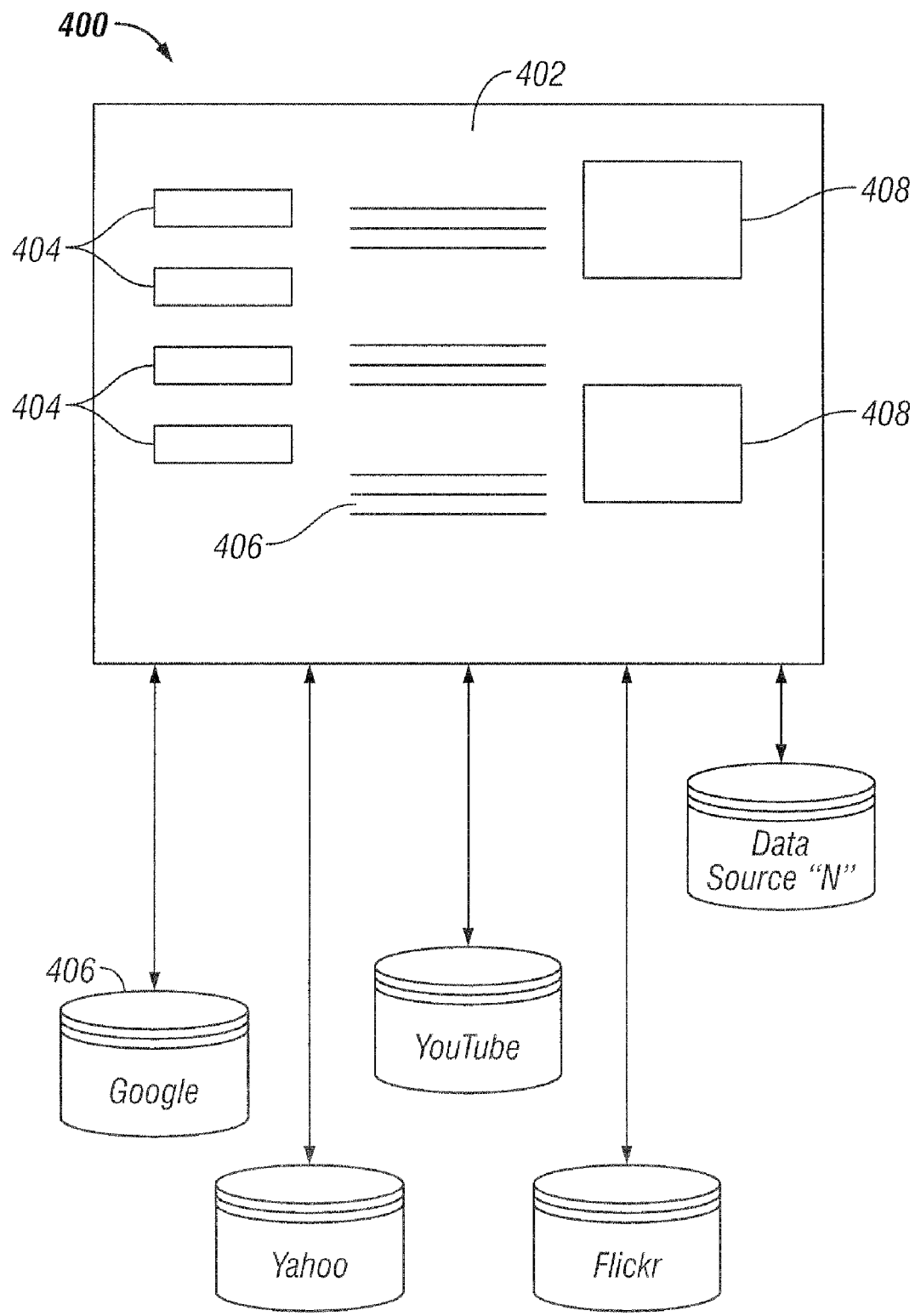
FIG. 4 is a block diagram representing the primary components of a typical View in an embodiment of the present invention.

Once the View Picker has performed its View picking duties as described above, the appropriate Views are assembled in a View Mix (334) by order of relevance. In the present embodiment, the Views are presented from left to right ordered by relevance. This is also shown in FIG. 4. The user navigates the View Mix and selects a View he or she feels is most appropriate to the search terms. The View Picker selection criteria are designed to ensure that the View Mix is displaying a satisfactory mixture of a) the most relevant Views, b) a diverse set of Views, and c) sponsored Views. It is important to note that in the current embodiment, the system has NOT yet performed the actual search request. All work up to this point is to assist the user in selecting the best possible search view.

Once the user selects a View (336), the user's browser is configured to display the View contents. This process begins by loading the View components (338). Placeholders are installed in the user's browser. The View then performs a data source query (340) by making an API call to the View server to obtain the contents to fill the placeholders in a generic fashion.

The data query made by the API call causes the View server to obtain and process the View search results. Each View has a unique "View-ID" which serves as one input parameter for the API call. The other parameters are: data source, processing flags, start result, and end result. The server receives the call and visits the data source with the search term. The results that are returned are noted and only the results between the supplied "start result" and "end result" parameters are loaded. The "processing flags" parameter instructs the server to perform processing on the results such as de-duplication and formatting.

Because search results are often repeated, the system caches them for faster retrieval. Thus, if the particular data query was for a result that was previously obtained, it may be pulled from system cache. If, however, the result is new or the cached result is not "fresh," the data query is performed and new data is obtained. Once the new data is obtained, the data is sent down to the View and the cache is refreshed.

External data sources format their data in a myriad of ways. Thus, when the system requests data from multiple sources, the need arises to translate or organize the results into some common format. This embodiment includes the building of data query object ("DQO") translators for each data source that provide such translation from the external source to one that can be consumed by the system at large, and by Views in particular. This mechanism provides a facility to handle both common data elements (e.g., title, URL) and ones that are proprietary to a data source (e.g., YouTube rating).

Once the translation is completed, the data is packaged and returned to the client browser where it is displayed in the proper View placeholders (342). First, the costly items are loaded (344) such as video or animated graphics. If the View has advertisements, another call may be implemented to pull the ad content to the client interface as well. Static items are also loaded (346) to complete the View display (348) and to allow the user to interact with the View (350).

Once rendered in the user's browser, there are several ways the user may interact with the View. For example, in the present embodiment the user may pan or page the displayed contents, rate the View, follow a link, select another View, or return to the original View Mix. Other types of interactions are possible and are within the scope of the present invention. The following are provided as examples and are not intended to be all-inclusive.

When a View is created it is difficult to predict the size and resolution of the screen on which it will ultimately be displayed. As such, the content must be created for some predetermined average-sized browser window. Programming techniques such as panning/paging may be utilized to allow a View with a significant amount of content to fit in a small browser window (352). Thus, the View may be rendered in the user's browser such that it is centered, while additional content exists beyond the left, right, top, and/or bottom boundaries. The user may then pan the display to view the hidden content. As the user pans, the View must load additional content (362) to present to the user. This may result in additional data source queries (340) and content generation (342-350). Likewise, the additional content may be included on additional "pages" or "tabs" that the user may select to view the content.

From a View, the user may be allowed to rate the View content (154) and then return to the View window (364). As mentioned previously, this allows the gathering of metrics on the particular Views which allows for more efficient and effective View selection by the View Picker. Any number and type of ratings may be allowed, such as look, speed, overall content, relevance to search, diversity of content, etc. Other rating and ranking mechanisms are possible and are within the scope of the invention.

From a View, the user may select a link to an external Web page (356). The user is then directed to this external URL (366). From that point, the user's browser loads the external link and the user's experience is controlled by the external website. In another embodiment, the present invention opens the external URL in a shell within the View display. This gives the appearance that the user is still within the control of the View system, which may be helpful for marketing and revenue purposes. For example, additional ads may be served and displayed in the surrounding View border that relate to the selected link.

From a View, the user may select yet another View (358). Although the user has selected a particular View, an area of the View browser is used to provide thumbnails of the remaining Views from the View Mix. Thus, the user may scan the additional Views and select another. Once another View is selected, the user is redirected to the new View (368).

From a View, the user may return directly to the View Mix (360). This returns the user to the View Mix home screen (370). This may be helpful to the user because the Views are displayed much larger to assist the user in determining which other View may be relevant. This may be easier to do from this window than from the "Mini-Mix" displayed at the top of the shell interface above the currently loaded view.

In the present embodiment, the primary shell of the user interface remains constant, and thus the text entry box (the search box) remains visible for modifying the search term (372). Adjacent to the search box is a multipurpose search button that changes based on the conditions of the search. It presents the user with different options based on where the user is in the process. If the user is just visiting and conducting his or her first search, the only option presented is "search: all views". However, if the user is on the Photo View, and is refining his or her search term, the button would provide the options, "Search: Photo View" and "Search: all views". Additionally, if the user is logged in and thus his or her preferences are known, including favorite views, then the additional option would be presented of "Search: favorite views". These are provided as examples and are not intended to be all-inclusive.

Search View

A View is a unique combination of user interface; processing widgets; and data sources that, together, present a set of search results to a user. In the present embodiment, Views may be created by any developer possessing basic skills in Web development. Because each view may be unique in its combination of these elements, the number of different possible views is limitless. For example, a View may use only one data source or it may use many. The View's basic function is to query the designated data sources, apply post-processing procedures on the search results obtained, and present the results to the user in a unique fashion as determined by the View developer.

The interface may be developed as any other Web type of application. For example, if the developer is competent in HTML/XML development he or she may assemble the necessary code to cause the View to display properly in a user's browser. Further, multiple technologies may be utilized such as the Adobe Flash technology suite including Action Script for adding functionality to the views. While HTML/XML and Flash have been provided as examples, any other Web development technology may also be incorporated. One skilled in the art will appreciate that any format suitable for displaying Internet content in a View in a user's browser or display—whether located on a PC, PDA, Smart Phone, Tablet, Internet Appliance, gaming platform, or the like—is within the scope of the present invention. Additionally, a broader application, developed internally, may automate the process of building a view such that anyone, including the general population with no particular development experience could "drag and drop" elements of a view into place and create a view from scratch.

The processing widgets typically include post-processing tools. For example, a widget may be utilized to accept data elements in a raw, unstructured format and organize the data elements for appropriate display. Further examples of widgets include those used to scrub, de-duplicate, cluster, stamp, rate, categorize, or reshape search result data sets. Such widgets may also be developed specifically for use in the View by a developer, or may be licensed from a third-party developer.

The data source (or sources) chosen for a particular view is based solely on the discretion of the View developer. For example, if a particular View developer wishes to focus his or her View on the music industry, a few data sources relevant to this industry may be incorporated. Further, the developer may have a favorite data source within this area. The present embodiment allows the developer to use either this single, favorite data source or the favorite data source featured more prominently among several additional data sources. Examples of data sources include search engines such as google.com and yahoo.com; social networks such as facebook.com; online file sharing sites like youtube.com, flickr.com; and online merchants such as amazon.com, ebay.com, etc.

The flexibility in View creation allows the present invention to uniquely tailor search results to the user's request. Views may be designed to be unique to a topic, function, or advertiser, or may be more generic in purpose. While textual content does serve a purpose, a picture is worth a thousand words. Thus, Views tend to be more visual in nature in order to convey to the user the greatest amount of information in the least amount of time and space. Views may be designed as utility (i.e., media focused with no regard to the type of content), categorical (such as travel, business, medical, etc.), niche (such as Xbox 360, Wii, etc.), sponsored (such as Microsoft, Apple, Nike, etc.), or the like. The View instruction set determines what the View will do with a particular search request (i.e., what data sources to call, what elements to display, etc.).

FIG. 4 depicts a block diagram representing a basic View (400). In this embodiment, the View interface (402) supports any unique combination of processing widgets (404), text (406) and graphics (408), and multiple data sources (410). The various elements may be oriented on the interface (402) in whatever fashion the developer sees fit.

View—Ad Space

The text (406) and graphics (408) elements may also include ad space to support generation of ad revenue with the system. A view may feature any number of IAB standard ad sizes (see IAB.net for online advertising standards) which can be placed in any location on the page above the "fold" (an arbitrary horizontal line, usually about 500 pixels from the top of any page that represents the area a user can see without scrolling down). View builders will be given certain guidelines regarding the ratio of ads to data results on a particular page expressed in pixels, ad units, or other applicable metrics.

There are two primary ways that Views are monetized in the current embodiment. While these two are not exhaustive, and may be complimented with other means, initially, a View may either have advertisements that are served up by an ad server (either internally or through a third party ad serving entity) or may have no advertisements, but be designed and implemented by a paying sponsor (i.e., a Sponsored View). In the case of a Sponsored View, the "ad" is in the form of the content of the results, the design elements of the view itself, and other logos and graphic elements of the sponsor as appropriate.

View Picker

The present embodiment features a component called the "View Picker." The View Picker utilizes specialized algorithms for selecting which Views to display and in what order. The View Picker must consider multiple criteria when determining which of the plurality of Views is most relevant to a search request. These criteria may include pre-defined user preferences, historical use data, search terms, amounts paid by advertisers, etc.

The View Picker first receives the search terms provided by the user. For example, the user may be conducting a search for "Newton Winery." This is highly specific to the food and wine category and to a winery in particular. The View Picker then reviews the list of available Views and makes a relevance calculation for each View with regard to the search terms. The View Picker is not delivering search results—its output is a list of views, ranked in order of relevance for the search request at hand.

The system in another embodiment may accept user preferences to assist in tailoring search results. User preference data may be collected in a number of ways, including collecting view rating data and collecting system statistics on what views a particular user frequently selects. This data can then be used as a relevance ranking criterion by the View Picker in making view selection decisions.

The present embodiment also takes into account the user's historical search patterns. The system employs popular methods utilized to track website visitors to follow their usage habits. If the user is logged-in to the system, their search data can be easily captured and connected to their profile to aid in future search disambiguation and future view picking. In the case of users who are not logged-in, a cookie may be placed on the user's machine that retains data regarding the time and date of a particular search, the search term, and the View or Views selected in response to the search. If the user does not accept tracking cookies, the originating IP address may be monitored to determine the origination of a search request. If an identifiable user has repeatedly searched for wines and wineries, the present embodiment would understand to look in this area if the user should subsequently enter "Pride" (which is the name of a California winemaker) with no further qualifiers.

Ratings and other performance metrics may be utilized by the View Picker when choosing Views. For example, certain data sources may be more efficient or faster than others. Consequently, a particular View may perform quite well (e.g., it has fast data sources) while another View that is tailored to the same category or topic performs rather poorly (e.g., it has slow data sources). The system may track the speed of each View and log the performance for comparison. When a subsequent search request is input, the View Picker can compare the performance metrics of the Views and offer the higher performing View instead.

In another embodiment, the system allows users to rate specific Views. When the user has accessed or utilized a given View, he or she may be provided an incentive to complete a survey or provide other feedback. Views may also be rated by other View developers. This ratings feedback may include data such as relevance to the search query, speed, visual appeal, etc. This information may then be saved on the system, either anonymously or identifiably, and may be used in future priority determinations. For example, a user may have rated a particular View as his favorite for movie searches. By accessing this data, the present embodiment will know to present this View whenever a relevant search term is received. In addition, such performance metrics provide feedback for developers to allow them to appreciate whether changes they have made to a View have improved or reduced the View's ratings.

In another embodiment, a View may be chosen responsive to an developer of the View having manually selected certain keywords or "tags" that match or closely match the search string of the user.

In yet another embodiment, a View may be chosen responsive to the search term being compared to a known list of terms that have been pre-categorized and sorted according to subject taxonomy and the subject matching a particular view's subject classification.

In yet another embodiment, the View may be chosen responsive to the View having been previously determined to be successful by some metric for historical searches of like search terms.

In yet another embodiment, the View may be chosen because the search engine was able to query an additional external source to determine the likelihood that the View would perform well for the given search term. For example, the external data source may conduct a query to IMDB.com with the word "crash" to determine that the View is a movie title and thus, a movie-centric View would be considered highly relevant.

In another embodiment, corporate sponsors may influence the View Picker's selections. For example, if a corporate sponsor with a low performing View wishes to have its View shown more frequently it has three options. First, it could modify the view's design, data sources, or other functional elements in an attempt to improve the view's intrinsic performance (its performance outside of any financial influence). This might require changing to higher quality data sources or changing the way the results content is presented. Second, it could keep the View as developed and merely pay higher advertising rates. These higher advertising rates can be adjusted accordingly depending upon how bad the View is. Showing a low performing View more often will likely be detrimental to the search utility provider because it will reduce overall site quality which will likely harm overall perception of the site and ad revenues. Thus, the corporate sponsor of the lower performing View must make up this difference to increase the priority of its Sponsored View. Third, the corporate sponsor could utilize some combination of the two previous options.

In this embodiment, the system also features a means for adjusting the balance between View performance and additional monies paid by a sponsor to have a low-performing View displayed more prominently. For example, it would be detrimental to the overall user experience to allow a sponsor with a very poor performing View to pay a substantial sum in order to have its View appear before others that are extremely high performing and more highly rated. If the higher performing Views are orders of magnitude greater in performance than the paying sponsor, a balance must be reached. Thus, the system considers not only the amount paid but also the performance differential between the respective Views.

The system also determines the price that the lower performing View sponsor must pay based upon the performance differential between the sponsor's View and the higher performing Views. For example, consider three sports Views: A, B, and C, wherein View A is the highest performing View and View C is the lowest performing View. View A uses only the best and most efficient sports data sources, and enjoys an arbitrary performance rating of 100 out of 100. View C uses a nondescript data source with random information, and enjoys a performance rating of 35 out of 100. View B uses some high-quality data sources but has poor bandwidth and consequently enjoys a performance rating of 85.

The View Picker, during normal operation, would order the sports Views as A-B-C and display them to the user in as such. This is because the user would likely have a better search experience if he or she were to choose the better performing View first. If B was unable to achieve the performance of A, B's sponsor could pay an extra fee to move B into the highest priority slot.

Because A and B are relatively close in performance; overall user satisfaction would likely not be impacted much by placing B before A in the View order. Thus, the amount to be paid by B to achieve this increased priority would be relatively low. C, on the other hand, is an extremely low performing View. If C's sponsor wished to increase its priority, the system would compare its performance differential with that of A and B.

Because C rates a 35 and A rates a 100, placing C before A would no doubt adversely impact overall system user experience. This would greatly impact the usage and, consequently, have an adverse impact on ad revenue. Thus, it is unlikely that the reduced system revenues could be effectively offset by charging C's sponsor for this increased priority. On the other hand, system use may not be as substantially impacted by moving C ahead of B in priority. Thus View C's sponsor could be required to pay a more reasonable amount to offset potential negative usage impact on the system by placing it before View B.

Next, consider a situation where the previous example also featured a View D with a performance rating of 20. View D's sponsor may only have to pay a very small amount to move its priority ahead of View C because they are only separated numerically by 15 points. However, the system may not allow View D to appear ahead of view B because of the performance differential (65 points). Moreover, the system would most assuredly not allow View D to appear before view A because of the detrimental impact this would have on overall user experience. Thus, this embodiment considers such a performance differential in establishing the necessary costs a sponsor will face to raise its view priority.

In yet another embodiment, the system considers the topic along with other performance criteria when calculating costs a sponsor will face to raise its View priority. For example, a particular topic may appeal only to less sophisticated users, such as children. In this case, the users may not be as concerned with the quality or speed of the data sources. As such, with the previously established example listing View A, B, and C, the system may allow C to appear ahead of A for a lesser amount than if the topic were "sports" directed towards more sophisticated adult viewers.

Once View performance and other data is registered, the View Picker can order the Views. Top performing Views get the highest priority and are displayed more prominently. Lower performing Views are moved to the end of the display queue. By displaying the higher performing Views more prominently, users will likely be more satisfied with the search utility and may be more likely to access the service on a repeat basis. This increased use should translate directly to greater advertising revenue. Conversely, if lower performing views are displayed more frequently the system will not perform as well—translating to a decrease in ad revenue due to reduced usage.

While specific criterion have been discussed, one skilled in the art will appreciate that this list is not inclusive. Other criterion may be applied and are within the scope of the present invention.

For an online search utility utilizing a system as disclosed herein, advertising revenue and subscription fees are vital to the utility's operability. However, users differ in their tolerance to advertisements. As such, one embodiment of the present invention features a tiered user subscription fee arrangement. First, the user must be registered with the search utility system. Registration is necessary for tracking usage habits and other metrics.

With this tiered arrangement, if the registered user decides that he or she does not want to view any ads whatsoever then the user must pay a membership fee to offset the revenues lost from the lack of advertisements. However, if the user is willing to view some ads then this fee can be reduced. For example, if the user is willing to view Sponsored Views only, then the user can pay approximately 75% of the full membership price and avoid all advertisements except those that are delivered in the form of Sponsored Views. Likewise, if the user is willing to accept sponsored Views and advertisements placed inside search Views, he or she must pay approximately half of the full membership price. The default subscription would require that the user view all ads. This would allow the user to access the site for free as it would allow the site to generate maximum ad revenue from the user's views. The numbers and prices used herein are for example purposes only and are not intended to limit the scope of any claims.

The subscription fees in this embodiment are established to offset the ad revenues lost due to users opting out of ad viewing. One skilled in the art will appreciate that the actual percentages that the full membership fee is reduced may vary depending on the viability of the website and its ability to generate sufficient ad revenue. Other percentages and combinations are within the scope of the present invention.

The advertising fees that a website may generate are directly related to the popularity and use of the website. For example, if a website gets a large volume of visits, then it can charge a higher amount for advertising space than a similarly situated website with fewer visits. However, the number of ads shown to a user has an inverse relationship with the user's overall satisfaction with the search utility. For example, if a high-traffic website begins to show too many ads, user satisfaction may drop and cause the number of visits to decline. Consequently, the reduced view metrics will cause advertising revenues to decrease as well. Therefore, a proper balance of advertising must be established to prevent user dissatisfaction.

For each user that opts out of advertising completely, the number of views of the ads declines proportionately. Thus, an approximation must be established as to how much ad revenue the website will lose for each user who opts out. This approximation is then used to calculate reasonable rates for the subscription fees.

In another embodiment, the user is given the most basic option of either viewing ads or not viewing ads. This can be helpful for a new website that is first attempting to establish itself. If there are very few users initially, usage can be cultivated by providing this option. The user could be required to renew this option periodically in order to reevaluate the success of the website. Once the website is fully operational, then a more sophisticated membership pricing plan can be implemented.

In yet another embodiment, the user could be allowed to select which ads he or she wishes to view and which ads he or she wishes to avoid. For example, banner and skyscraper ads are relatively benign and may actually provide a user with important information. Many users may simply choose to allow these ads to be shown on their results page. Others, however, may be inclined to choose only pop-ups or bridge ads since some actually feature interesting videos or games. The default could be either "show all ads" or "show no ads" depending on the maturity of the website. If ad revenue is vital, the website may default to the former. If not, the website may default to the latter in order to improve user satisfaction.

In yet another embodiment, the system allows users to view ads for a predetermined period in order to receive free access to the service for the remainder of a longer period. For example, a search engine utility may require a user to view 30 minutes of ads before his or her access switches to ad-free viewing. The 30 minutes can be either contiguous or broken into a longer period, so long as the ad-free viewing doesn't occur until after the combined 30 minutes is achieved.

In yet another embodiment, the website allows a user to view a predetermined number of ads before getting a period of ad-free usage. For example, the website may require the user to view 50 ads at the beginning of a fixed period. Once the user has viewed the 50 ads, the remainder of the period is ad-free. If the user has not completed viewing 50 ads by the end of the period, the count starts over. Thus, at the outset of the fixed period, the number of ads viewed is reset. This may encourage more usage at the outset of the period to achieve the ad-free viewing. A benefit of this would be to allow more highly targeted and valuable ads to be shown to the user at the outset.

System Search Utilities

In yet another embodiment, the system provides a parsing and analysis module. This module operates as an add-in, macro, or extension within the user's browser. A toolbar button may allow the user to perform a manual search on a rendered webpage by activating the button, or the module could be configured to automatically parse and analyze a webpage once it is rendered. Once activated, the module processes the contents of the webpage (including the URL, RSS information, meta tags, contents displayed to the user, and computer code) and determines—from the context of the webpage—what search terms would be most highly related to the page.

In this embodiment, the parsing and analysis module would process the RSS information, meta tags, and similar information. One skilled in the art will appreciate that the webpage contents selected for processing by the parsing and analysis module could vary based on user or third party requirement, and may include all or just some of the data available on a given webpage.

This module can interpret webpage data in a variety of ways, and may place varying levels of importance on a different data types contained in the webpage data. For example, the parsing and analysis module could place greater importance on the text displayed on the webpage to the user. The module might then analyze this text by sorting out words that are likely inconsequential—such as articles and conjunctions—counting the number of times each remaining word appears in webpage text. It would then compare the words that appear most frequently to a list of known terms and a subject taxonomy and generate a list of search terms including the most frequently appearing words and corresponding synonyms. In another example, the module might place greater importance on meta tags and simply generate a list of search terms using the meta tags contained on the particular webpage.

In this embodiment, the parsing and analysis module outputs resulting search terms (which will likely embody the internet user's primary areas of interest) to the system of the present invention. The system then processes these search terms as it would any search request. Processing occurs as previously described (above).

In another embodiment, a button may be placed in the user's browser (voluntarily by the user) that would invoke a specialized search view whose data source is the referring website (or the website the user was visiting just prior to pushing the button). One skilled in the art will appreciate that the visual representation of the custom View could take a variety of forms and be defined by the system or a third party developer. In yet another embodiment, the custom View could include a navigation element (such as a tag cloud), which could be used to organize, navigate, and refine query results.

Once the user has requested custom View generation, the resulting custom View is displayed in the user's browser. One possible design of the custom View would include the search terms generated by the parsing and analysis module and used to query the predetermined sources, the original webpage (this could be true especially if the webpage also happens to be one of the predetermined sources, e.g., wikipedia.org), results from multimedia (music or video) websites that have been included in the list of predetermined sources, advertising, and results from internet search engines that have been included in the list of predetermined sources.

When the parsing and analysis module has analyzed a webpage (whether manually or automatically), queried the system, and the system has returned results indicating that relevant previously developed Views exist, the actuation button within the browser toolbar may graphically indicate this fact to the user. If the user wishes to view the relevant Views, the user may then interact with the button, such as by moving a mouse cursor over the button and pressing down on the left mouse button. Once the user has interacted with the button, the relevant Views will be displayed in the user's browser.

In another possible embodiment, when the webpage has been analyzed by the system (either manually or automatically), the invention could cause a message box to "pop up" on the user's computer monitor containing text or some other graphical representation conveying the existence of relevant Views. The user could then request the relevant Views by interacting with the text box by, for example, clicking on a button with the user's mouse or pressing the enter key on the user's keyboard. The relevant Views would then be accessed and displayed on the user's computer monitor.

In yet another possible embodiment, upon parsing and analyzing a given webpage, querying the customizable multi-dimensional search engine, and receiving results indicating that relevant previously developed views exist, the invention could display "thumbnail"-sized preview images of the relevant previously developed views in some portion of the user's internet browser. The user could then request a given relevant previously developed view by clicking on the image with the user's mouse.

Initial Search Page

Screenshots of the interface of the present embodiment are provided as figures. FIG. 5 depicts the initial user interface (500). When a user accesses the system, this page is presented first. A means for entering the user's search term is provided (302) along with basic directions for system use (504). To emphasize the simplicity and efficiency of the invention, this interface is highly simplistic yet visually appealing. To initiate a search, the user need only enter a search term (502) and select "Go" (506). The search term processing then begins as depicted in the flow diagram of FIG. 3, as described above.

View Mix Page

FIG. 6 depicts the View Mix page. After selecting "Go" on the main interface, the system preprocesses the search term and presents the user with the View Mix page (600). The View Mix page (600) presents the Views (604-612) that the View Picker determines are most relevant to the search request. This page is highly simplistic yet visually appealing as well in order to emphasize the simplicity and efficiency of the invention.

Further depicted on the View Mix in this embodiment are five Views: the "Clean & Simple" View (604); the "Photo" View (606); the "Video" View (608); the "Text" View (610); and the "4 Sources" View (612). Present in the View Mix but not shown in the diagram are four other Views: the "Book" View; "Gadget" View; "News" View; and the "Shopping" View. These hidden Views may be accessed from the View Mix by panning the displayed page using the arrow buttons (602) on either side or by "grabbing and dragging" the displayed page with the mouse pointer. Details of each of the nine Views follow. Each View appears blurred to prevent the user from mistaking the images as results of the actual search. Specific Views are discussed, below, merely as examples. This list of Views is not intended to be limiting. To the contrary, the scope of the present invention includes these Views and any others that may be designed.

Clean & Simple View

Figure 7:
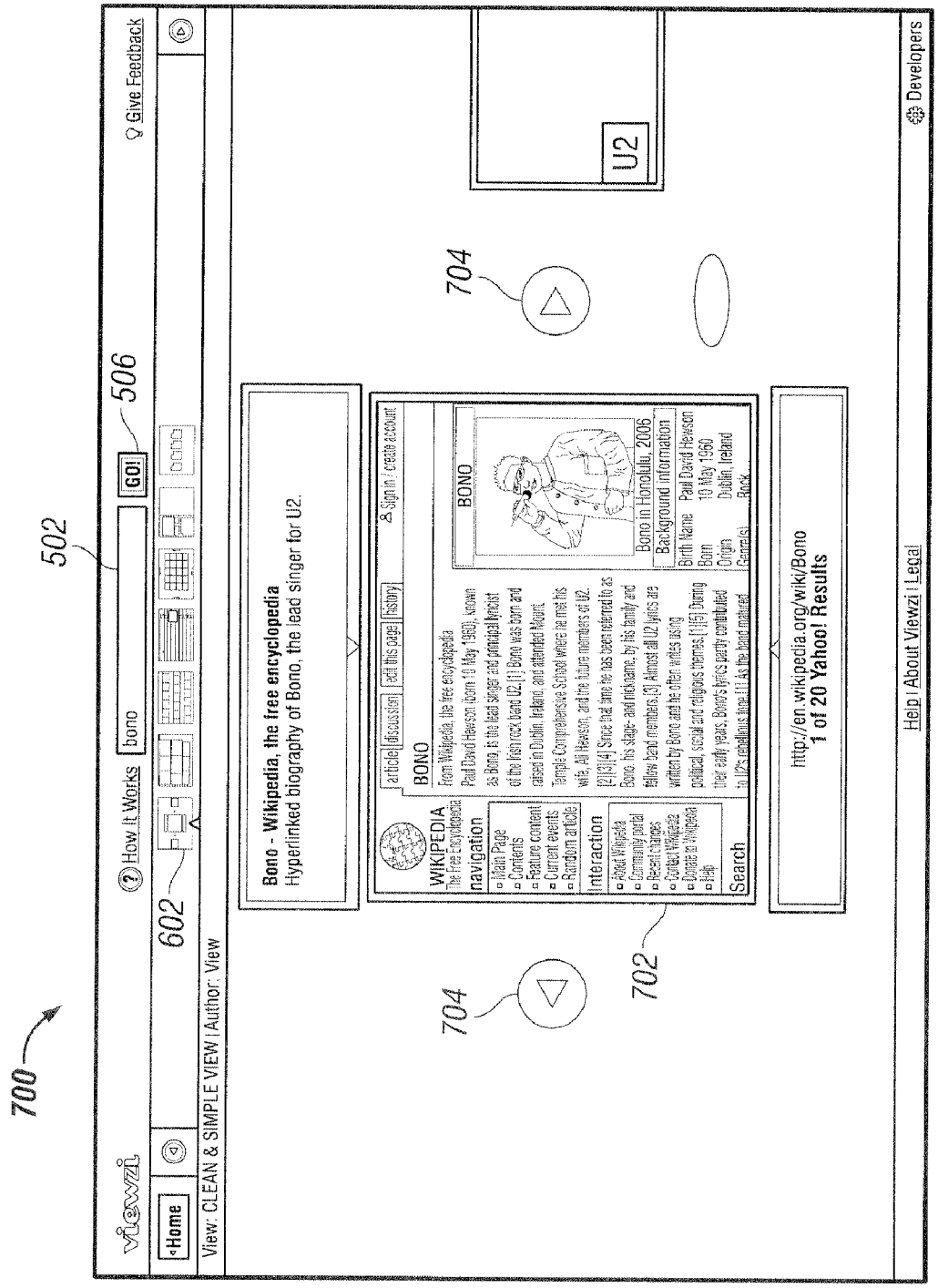
FIG. 7 is a representation of the "Clean and Simple View," and is an example of one embodiment of a specialized View.

The Clean & Simple View (604) is one embodiment of a View. FIG. 7 presents this View in greater detail (700). As depicted, this View presents search results in a clean and simplified manner. The image shown is a screenshot of the most relevant search results URL page (702). The screenshot depicted is the results URL page with the accompanying advertising applets filtered out. However, other embodiments may also leave the advertisings in place.

The number of search results URLs is usually quite large. Therefore, a means is provided (704) for the user to scroll between the screenshots of each results URL webpage. By clicking the arrow (704), the user can see a screenshot of the next most relevant results URL. When the user sees a results URL that is of interest, he or she need only click on the screenshot (702) to access the actual results page. The original search term and input box (502) are also included to allow the user to refine the search terms within the View. Thumbnails representing the original View Mix display (the "Mini-Mix") (602) are also present to allow the user to select another View without returning to the previous page.

Photo View

Figure 8:
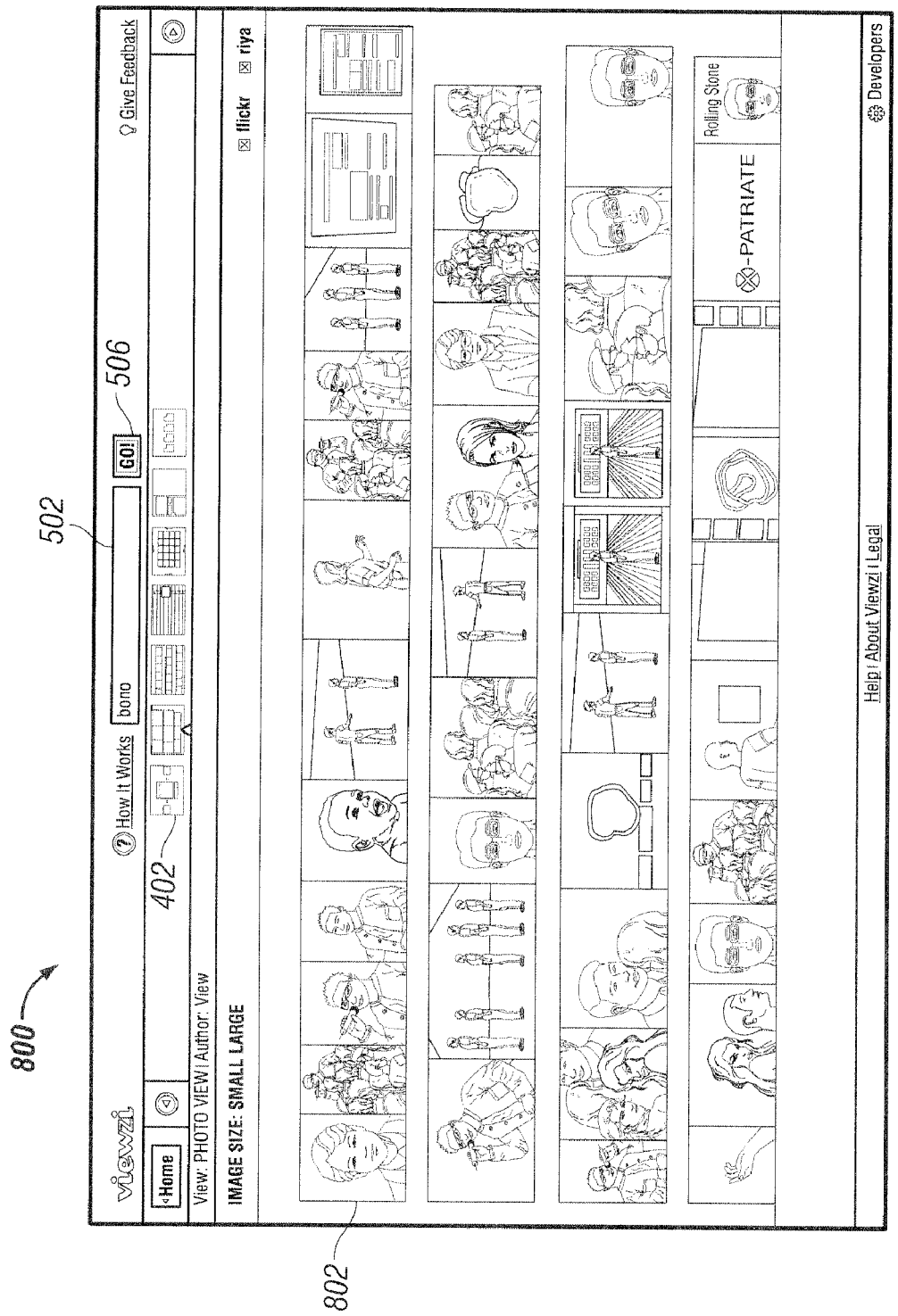
FIG. 8 is a representation of the "Photo View," and is an example of one embodiment of a specialized View.

The Photo View (606) is another embodiment of a View. FIG. 8 presents this View in greater detail (800). The purpose of this View is to present, in a useful and user-friendly way, photos relevant to the search request. The photos deemed most relevant (802) appear in the upper left corner and decrease in relevance as one moves from left to right. Each photo image is a screenshot of the original, cached locally to improve overall system latency. Further, each photo image serves as a hyperlink to the original photo and returns the original image in either the same or another browser window. The original search term and input box (502) are also included to allow the user to refine the search terms within the View. The original View Mix display (602) is also present to allow the user to select another View without returning to the previous page.

Video View

Figure 9:
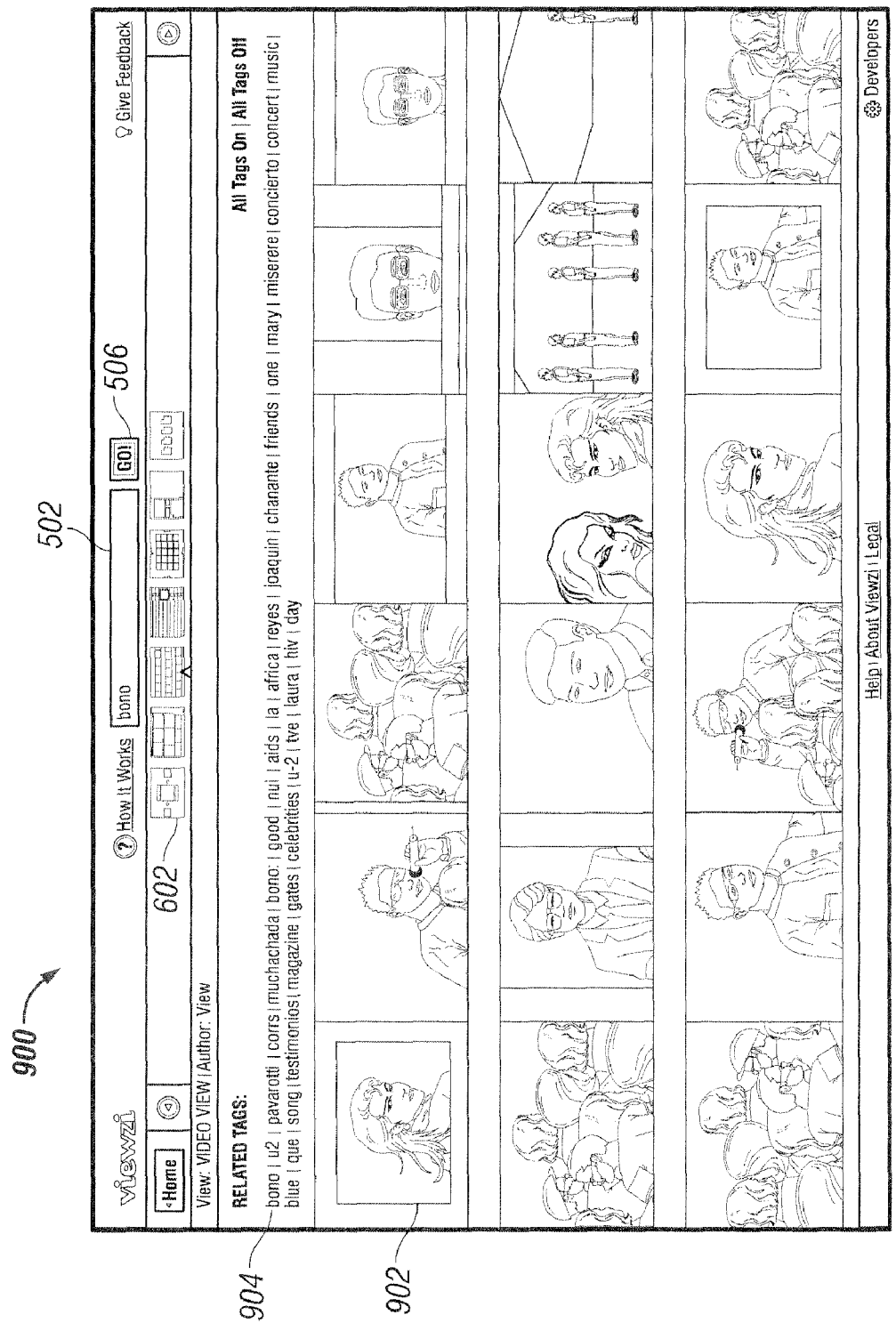
FIG. 9 is a representation of the "Video View," and is an example of one embodiment of a specialized View.

The Video View (608) is yet another embodiment of a View. FIG. 9 presents this View in greater detail (900). The search results URLs (pointing to relevant videos) are presented as screenshots (or thumbnails) of the particular videos (902). The most relevant video is presented first (902) and the relevance decreases from left to right. Each screenshot also serves as a hyperlink to the original video. If a user selects one of the screenshots, the original video is displayed in either the same or another browser window. Related tags for narrowing the search term are also presented (904) along with the original search term and input box (502) to allow the user to refine the search terms within the View. The original View Mix display (602) is also present to allow the user to select another View without returning to the previous page.

Text View

Figure 10:
FIG. 10 is a representation of the "Text View," and is an example of one embodiment of a specialized View.

The Text View (610) is yet another embodiment of a View. FIG. 10 presents this View in greater detail (1000). This View demonstrates that the traditional text search results (1002) may be returned by the system as well. In this embodiment, a screenshot (1004) of the results link (1002) is also included. This allows the user to make a quick visual evaluation as to whether the link is worth accessing. The original search term and input box (502) are also included to allow the user to refine the search terms within the View. The original View Mix display (602) is also present to allow the user to select another View without returning to the previous page.

"4 Sources" View

Figure 11:
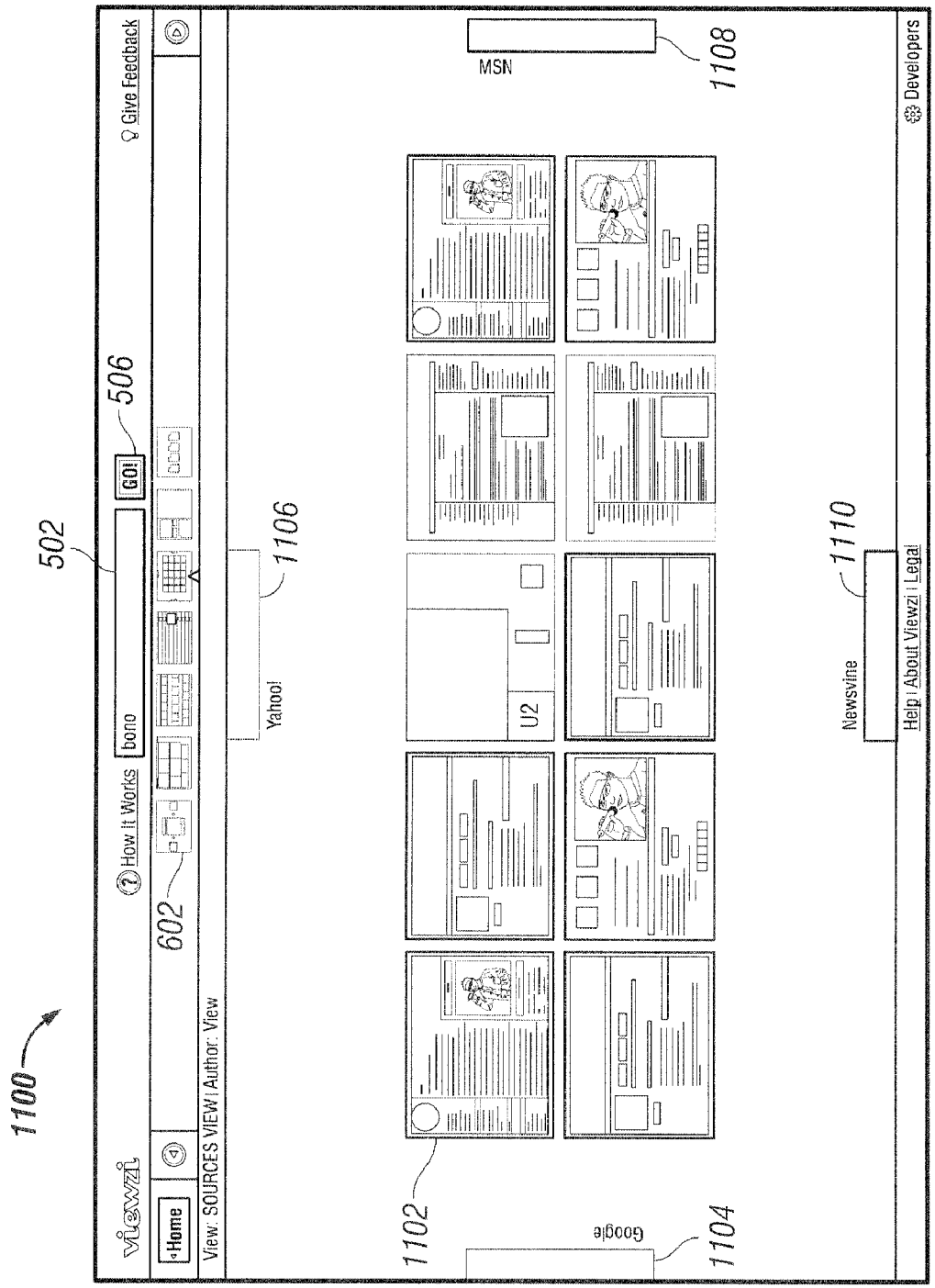
FIG. 11 is a representation of the "4 Sources View," and is an example of one embodiment of a specialized View.

The Photo View (612) is yet another embodiment of a View. FIG. 11 presents this View in greater detail (1100). This View serves as a "meta-search" view in that four data sources (1104-1110) are utilized. The results of the search from one of the data sources (1104) are displayed as screenshots (1102). The most relevant result is located in the upper left corner (1102) and relevance decreases from left to right). Each screenshot serves as a hyperlink to the original page. To view results from a different data source, one need only select the desired data source link (1104-1110). The original search term and input box (502) are also included to allow the user to refine the search terms within the View. The original View Mix display (602) is also present to allow the user to select another View without returning to the previous page.

Book View

Figure 12:
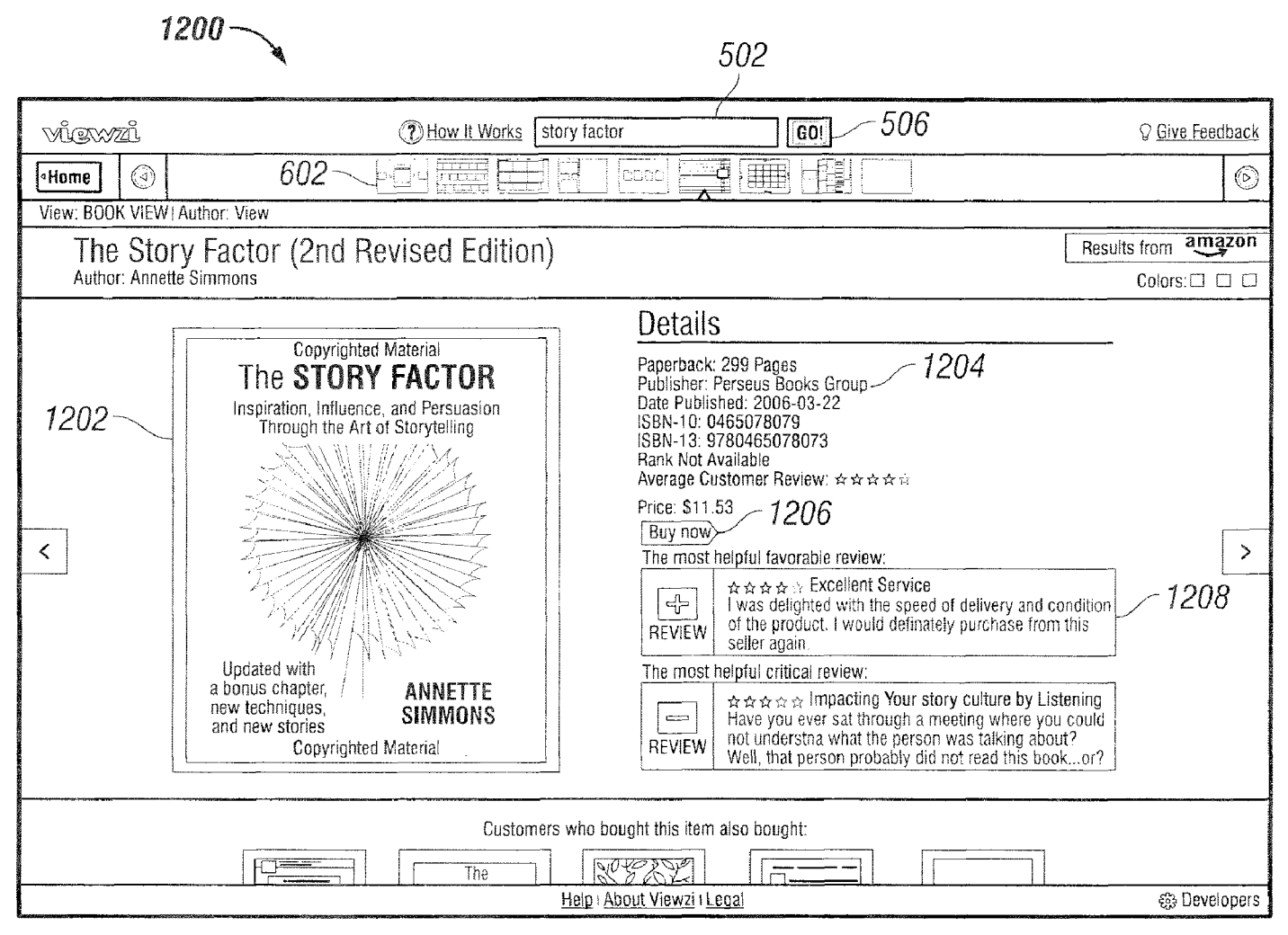

The Book view (1200) is yet another embodiment of a View. FIG. 12 presents this View in greater detail (1200). This view serves as an example that data from existing merchant websites may be "repackaged" and displayed in a more efficient and user-friendly manner. For example, the book depicted (1202) is one that is available on the merchant site, Amazon. Data from the Amazon website—such as the book image (1202), details (1204), and customer feedback (1208) may be reformatted and displayed in the View. Moreover, the View may allow you to purchase the book directly from Amazon by providing a link (1206) to make the transaction. The user may also switch to the next most relevant search result by selecting the arrow link (1210). The original search term and input box (502) are also included to allow the user to refine the search terms within the View. The original View Mix display (602) is also present to allow the user to select another View without returning to the previous page.

Gadget View

Figure 13:
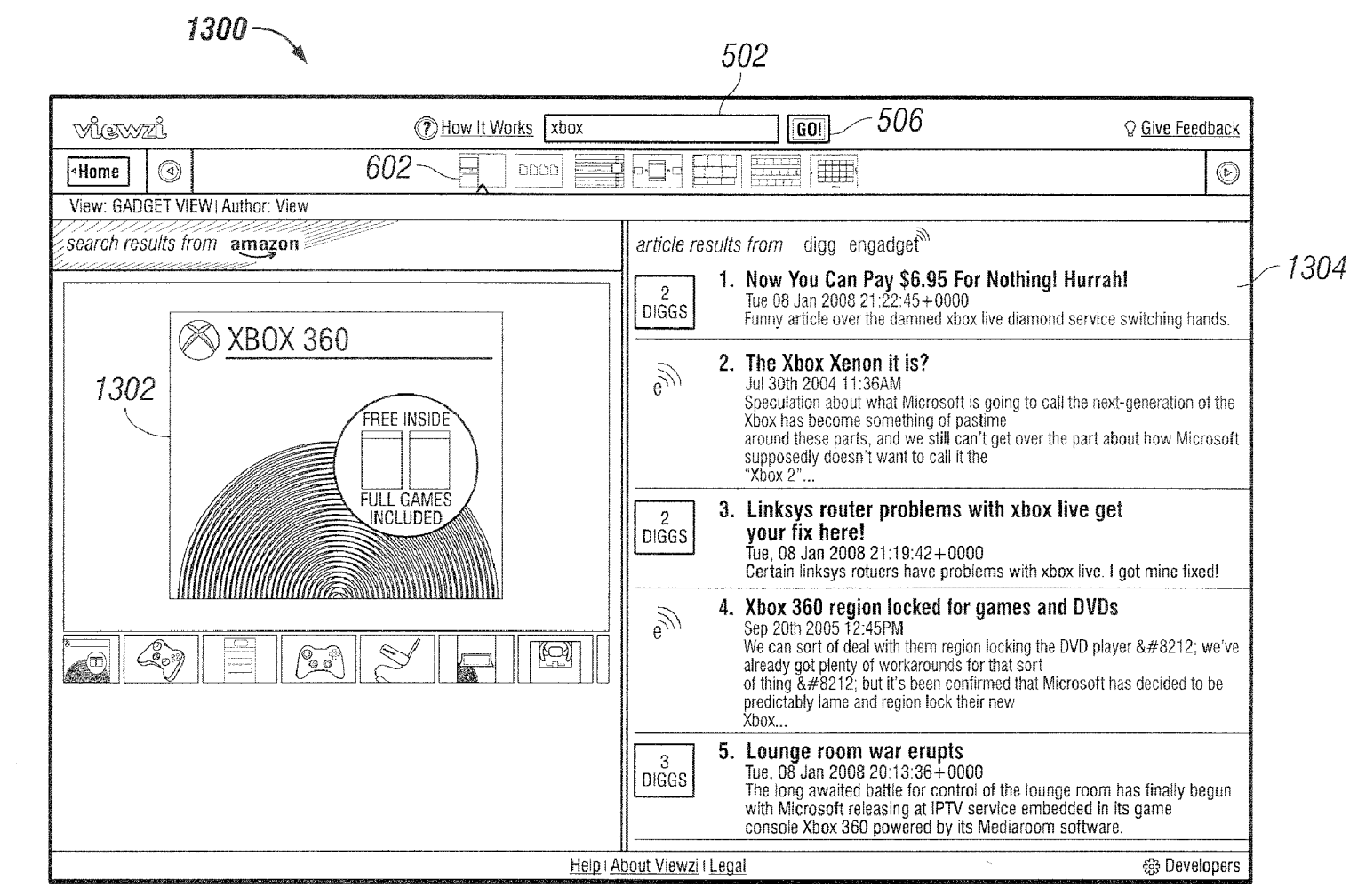

The Gadget view (1300) is yet another embodiment of a View. FIG. 13 presents this View in greater detail (1300). This View focuses the search to data sources that are device, or "gadget" oriented. The image of the device being displayed (1302) is merely repackaged from Amazon. Also presented are links (1304) to articles discussing the particular device. The original search term and input box (502) are also included to allow the user to refine the search terms within the View. The original View Mix display (602) is also present to allow the user to select another View without returning to the previous page.

News View

Figure 14:
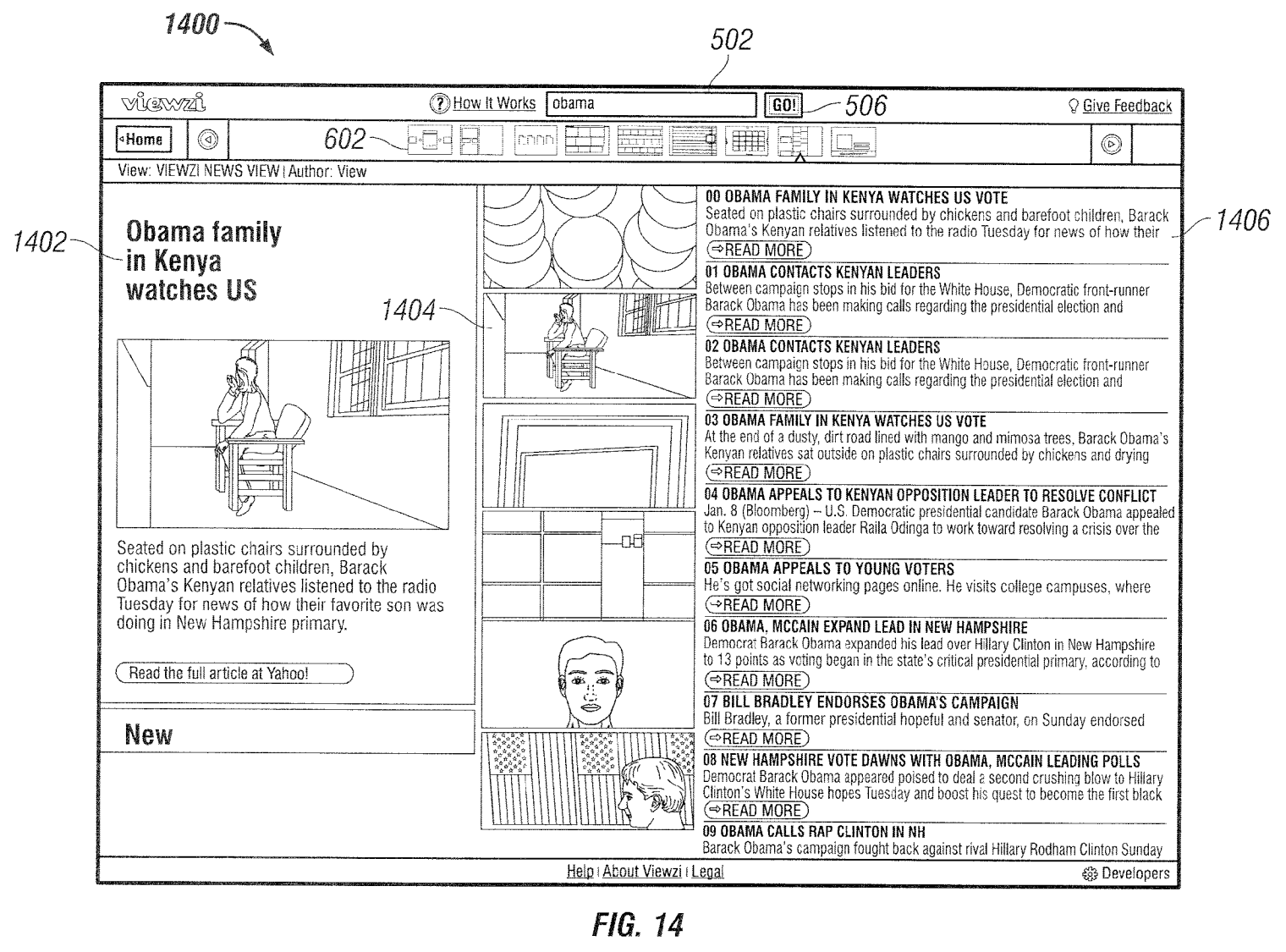

The News view (1400) is yet another embodiment of a View. FIG. 14 presents this View in greater detail (1400). This View focuses the search to news oriented data sources. Highly relevant headlines (1402) are displayed along with any images or video. Links to news content (1406) and screenshots (1404) related to those links are also presented. Clicking on a link (1406) or screenshot (1404) brings up the original website or video to which the link points. The original search term and input box (502) are also included to allow the user to refine the search terms within the View. The original View Mix display (602) is also present to allow the user to select another View without returning to the previous page.

Shopping View

Figure 15:
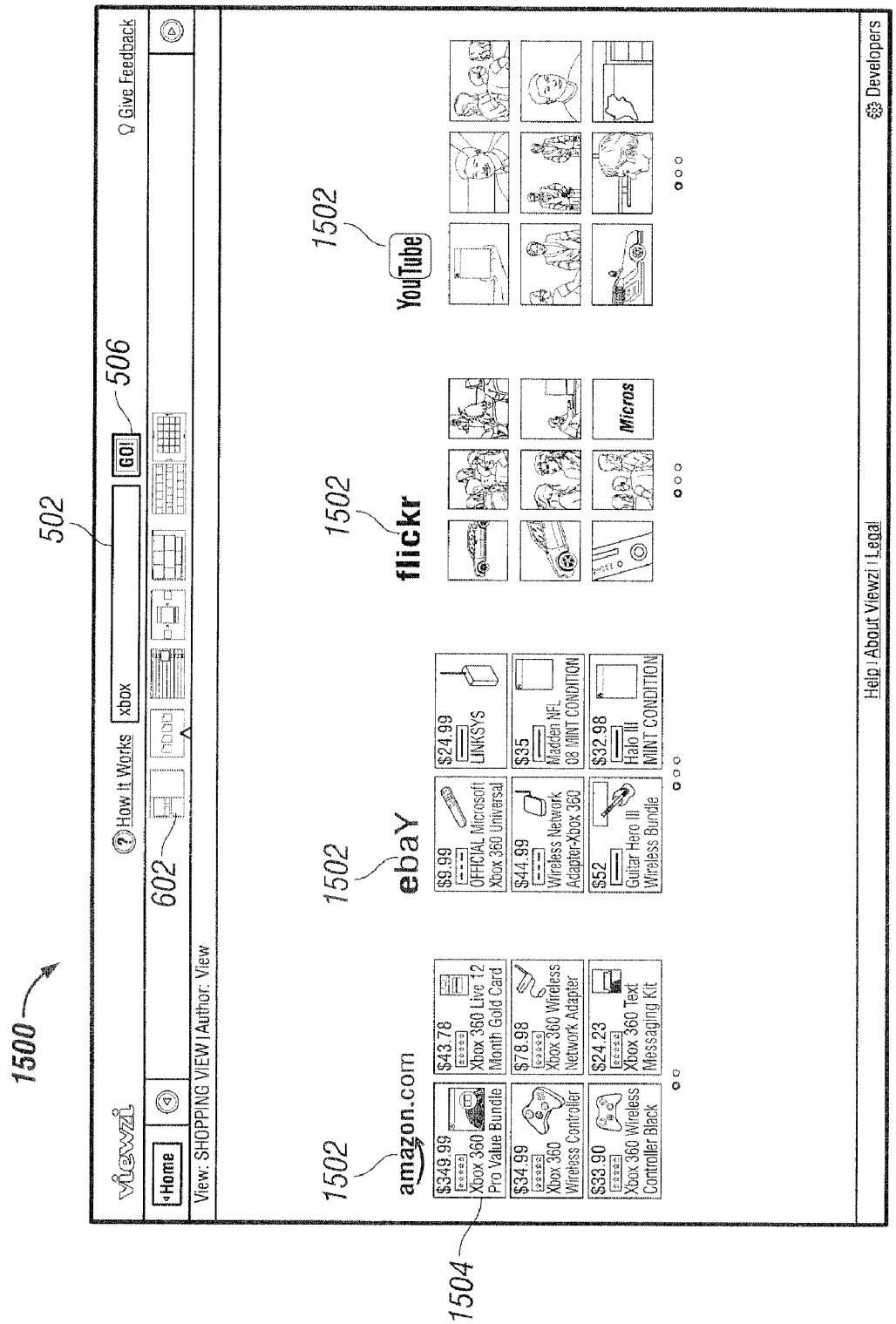
FIG. 15 is a representation of the "Shopping View," and is an example of one embodiment of a specialized View.
Figure 16:
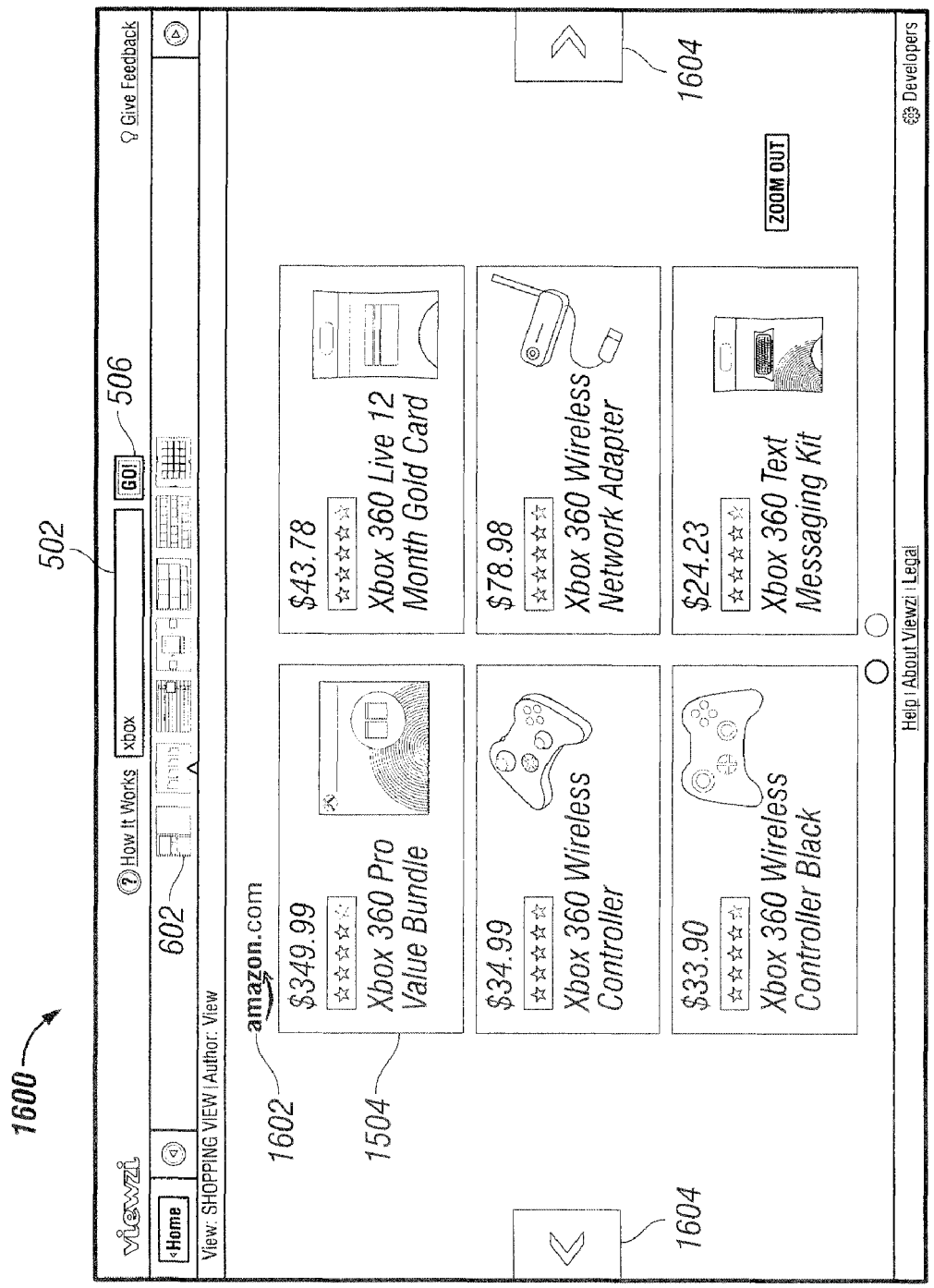
FIG. 16 is a representation of the "Shopping View" upon selecting one of the displayed merchants.

The shopping view (1500 and 1600) is yet another embodiment of a View. FIG. 15 and FIG. 16 each present this View in greater detail. This View focuses the search on specific merchant data sources. For example, four merchants are provided (1502). When the user selects one merchant, screenshots of content relevant to the search for that particular merchant are displayed (1504). When the user selects one of the links to a particular good offered by that merchant (1606), the originating page is presented to the user. If, however, the user wishes to see the offerings from another of the provided merchants, he or she need only select the arrow (1604) and the next merchant's screenshots are presented. The original search term and input box (502) are also included to allow the user to refine the search terms within the View. The original View Mix display (602) is also present to allow the user to select another View without returning to the previous page.

While specific examples of system interfaces were described and shown, the invention may be embodied in other specific forms without departing from the spirit or essential characteristics thereof. For example, the Views depicted may be modified as necessary to incorporate other elements as the developer sees fit. The present embodiments are therefore to be considered in all respects as illustrative and not restrictive or otherwise limiting. Accordingly, the scope of the invention is established by the appended claims rather than by the foregoing description. All changes which come within the meaning and range of equivalency of the claims are therefore intended to be embraced therein.

The recitation of method steps does not necessarily denote a particular sequence for execution of the steps. Such method steps may therefore be performed in a sequence other than that recited—or even concurrently—unless the particular claim expressly states otherwise. (58,266).

We claim:

1. A method for fulfilling an Internet search request for information related to a user's search term, the method steps comprising:
    (a) accepting a search term from the user;
    (b) automatically selecting a plurality of search Views having dynamically computed degrees of relevance to the search term, wherein the relevance is determined utilizing at least one relevancy criterion, wherein each View comprises a unique combination of data presentation, processing widgets, and preselected data sources from which search results are obtained for the View;
    (c) displaying the plurality of search Views to the user;
    (d) accepting user selection of a View;
    (e) obtaining search results based on the search term by utilizing an instruction set for the selected View; and
    (f) displaying the search results within the selected View to the user.

2. The method of claim 1 wherein at least one prior search result is cached and the cache is checked for a given search result prior to obtaining the search result directly from the returned URL.

3. The method of claim 1, the method steps further comprising:
    (a)(1) performing pre-search formatting and processing of the search term.

4. The method of claim 1, the method steps further comprising:
    (a)(1) obtaining at least one pre-search result from at least one data source;
    (a)(2) loading the Web page represented by the at least one pre-search result URL into a browser instance;
    (a)(3) obtaining at least one screenshot of the Web page; and
    (a)(4) retaining the at least one screenshot for subsequent retrieval.

5. The method of claim 4, wherein the browser instance is a headless browser instance that exists in system memory.

6. The method of claim 4 wherein the method steps (a)(1) through (a)(4) are performed independently and concurrently with any of method steps (b) through (f).

7. The method of claim 4 wherein the screenshot is saved in an objectstore.

8. A computer software program tangibly embodied in a computer readable storage medium, the program including machine-readable instructions executable by a computer processor for performing a method for fulfilling an Internet search request for information related to a user's search term, the program steps comprising:
   (a) accepting a search term from the user;
   (b) automatically selecting a plurality of search Views having dynamically computed degrees of relevance to the search term, wherein the relevance is determined utilizing at least one relevancy criterion, wherein each View comprises a unique combination of data presentation, processing widgets, and preselected data sources from which search results are obtained for the View;
   (c) displaying the plurality of search Views to the user;
   (d) accepting user selection of a View;
   (e) obtaining search results based on the search term by utilizing an instruction set for the selected View; and
   (f) displaying the search results within the selected View to the user.

9. The computer software program of claim 8 wherein at least one prior search result is cached and the cache is checked for a given search result prior to obtaining the search result directly from the returned URL.

10. The computer software program of claim 8, the program steps further comprising:
   (a)(1) performing pre-search formatting and processing of the search term.

11. The computer software program of claim 8, the program steps further comprising:
   (a)(1) obtaining at least one pre-search result from at least one data source;
   (a)(2) loading the Web page represented by the at least one pre-search result URL into a browser instance;
   (a)(3) obtaining at least one screenshot of the Web page; and
   (a)(4) retaining the at least one screenshot for subsequent retrieval.

12. The computer software program of claim 11, wherein the browser instance is a headless browser instance that exists in system memory.

13. The computer software program of claim 11 wherein the program steps (a)(1) through (a)(4) are performed independently and concurrently with any of method steps (b) through (f).

14. The computer software program of claim 11 wherein the screenshot is saved in an objectstore.

15. A system for fulfilling an Internet search request for information related to a user's search term, the system comprising:
   a first computer, wherein the first computer is in communication with the Internet and is capable of generating and accepting requests for data; and
   wherein the first computer performs the program steps comprising:
   (a) accepting a search term from the user;
   (b) automatically selecting a plurality of search Views having dynamically computed degrees of relevance to the search term, wherein the relevance is determined utilizing at least one relevancy criterion, and wherein each View comprises a unique combination edam presentation, processing widgets, and preselected data sources from which search results are obtained for the View;
   (c) displaying the plurality of search Views to the user;
   (d) accepting user selection of a View;
   (e) obtaining search results based on the search term by utilizing an instruction set for the selected View; and
   (f) displaying the search results within the selected View to the user.

16. The system of claim 15 wherein at least one prior search result is cached and the cache is checked for a given search result prior to obtaining the search result directly from the returned URL.

17. The system of claim 15 wherein the first computer performs the program steps further comprising:
   (a)(1) performing pre-search formatting and processing of the search term.

18. The system of claim 15 wherein the first computer performs the program steps further comprising:
   (a)(1) obtaining at least one pre-search result from at least one data source;
   (a)(2) loading the Web page represented by the at least one pre-search result URL into a browser instance;
   (a)(3) obtaining at least one screenshot of the Web page; and
   (a)(4) retaining the at least one screenshot for subsequent display to the user.

19. The system of claim 18, wherein the browser instance is a headless browser instance that exists in system memory.

20. The system of claim 18 wherein the program steps (a)(1) through (a)(4) are performed independently and concurrently with any of method steps (b) through (f).

21. The system of claim 18 wherein the screenshot is saved in an objectstore.

22. The system of claim 15 further comprising a Pre-Cache Module or a Predictive Screenshotter Module.

* * * * *

UNITED STATES PATENT AND TRADEMARK OFFICE
CERTIFICATE OF CORRECTION

| | | |
|---|---|---|
| PATENT NO. | : 7,899,803 B2 | Page 1 of 1 |
| APPLICATION NO. | : 12/033823 | |
| DATED | : March 1, 2011 | |
| INVENTOR(S) | : Brandon Cotter and Christopher J. Mancini | |

It is certified that error appears in the above-identified patent and that said Letters Patent is hereby corrected as shown below:

In the Claims
Column 22, line 11 of Claim 15, please delete "edam" and insert --of data--.

Signed and Sealed this
Twenty-first Day of February, 2012

David J. Kappos
*Director of the United States Patent and Trademark Office*